(12) United States Patent
Maskell

(10) Patent No.: US 7,333,052 B2
(45) Date of Patent: Feb. 19, 2008

(54) SIGNAL PROCESSING WITH REDUCED COMBINATIONAL COMPLEXITY

(75) Inventor: Simon Richard Maskell, Malvern (GB)

(73) Assignee: Qinetiq Limited (GB)

( * ) Notice: Subject to any disclaimer, the term of this patent is extended or adjusted under 35 U.S.C. 154(b) by 232 days.

(21) Appl. No.: 10/562,782

(22) PCT Filed: Jun. 24, 2004

(86) PCT No.: PCT/GB2004/002703

§ 371 (c)(1),
(2), (4) Date: Dec. 28, 2005

(87) PCT Pub. No.: WO2005/003812

PCT Pub. Date: Jan. 13, 2005

(65) Prior Publication Data

US 2007/0096975 A1    May 3, 2007

(30) Foreign Application Priority Data

Jul. 1, 2003   (GB)   ................................. 0315349.1

(51) Int. Cl.
*G01S 13/66* (2006.01)

(52) U.S. Cl. .................... 342/195; 342/95; 342/96; 342/97; 342/189

(58) Field of Classification Search ............. 342/89–97, 342/107–108, 115, 135, 140, 145–146, 189, 342/195

See application file for complete search history.

(56) References Cited

U.S. PATENT DOCUMENTS 4,891,762 A * 1/1990 Chotiros ................... 701/223

(Continued)

FOREIGN PATENT DOCUMENTS

JP    2001-099925    4/2001

OTHER PUBLICATIONS

Zhou et al., "An Efficient Algorithm for Data Association in Multitarget Tracking", IEEE Transactions on Aerospace and Electronics Systems, vol. 31, pp. 458-468 (1995).

(Continued)

*Primary Examiner*—John B Sotomayor
(74) *Attorney, Agent, or Firm*—McDonnell Boehnen Hulbert & Berghoff LLP

(57) ABSTRACT

Signal processing with reduced combinatorial complexity for tracking evolving phenomena such as radar tracks associated with weighted measurement parameters includes selecting a current phenomenon and obtaining a set of measurement parameters associated with it. Beginning at a start node providing a first parent node having an identity, an identity for a child node of the patent is produced from the sets of parameters, the parent identity and a parameter selected from the set and corresponding to the child. This is iterated for other parameters in the set. Child nodes of like identity for the phenomenon are treated as a single node with multiple parameter relationships associated with at lest one parent node, whereas child nodes with differing identities are represented as separate nodes. The process is iterated for other phenomena and associated sets of measurement parameters, but child nodes of a previously processed phenomenon are not treated as parent nodes of a phenomenon processed immediately following. Updated sets of parameters weights associated with respective phenomena are derived by iterating over node relationships and identifies. This provides a probabilistic assessment of track evolution.

24 Claims, 14 Drawing Sheets

U.S. PATENT DOCUMENTS

| | | | |
|---|---|---|---|
| 5,341,142 A * | 8/1994 | Reis et al. | 342/64 |
| 5,355,325 A | 10/1994 | Uhlmann | |
| 5,379,044 A * | 1/1995 | Carlson et al. | 342/90 |
| 5,537,119 A | 7/1996 | Poore, Jr. | |
| 5,798,942 A * | 8/1998 | Danchick et al. | 342/96 |
| 5,947,413 A * | 9/1999 | Mahalanobis | 244/3.17 |
| 6,229,475 B1 * | 5/2001 | Woolley | 342/93 |
| 7,193,557 B1 * | 3/2007 | Kovacich et al. | 342/89 |
| 7,236,121 B2 * | 6/2007 | Caber | 342/62 |
| 2007/0096975 A1 * | 5/2007 | Maskell | 342/95 |

OTHER PUBLICATIONS

Kurien, et al."Issues in the design of practical multitarget tracking algorithms, chapter 3 of multitarget-multisensor tracking: advanced application", Multitarget-Multisensor Tracking Advanced Applications, pp. 43-83 (1990).

* cited by examiner

SIGNAL PROCESSING WITH REDUCED COMBINATIONAL COMPLEXITY

BACKGROUND OF THE INVENTION

1. Field of the Invention

This invention relates to signal processing with reduced combinatorial complexity, and to various aspects thereof, i.e. to an automated method, an apparatus and a computer program for implementing such processing. It is particularly (but not exclusively) relevant to reduction of combinatorial complexity in radar target tracking.

2. Description of the Art

Combinatorial complexity (or combinatorial explosion) in signal processing is well known. It arises in a situation where there is an evolving set of phenomena for which at intervals parameters are determined (e.g. measurements are made) which incompletely characterise the phenomena. At each individual interval it is not possible to associate parameters with respective phenomena unambiguously, in which case from interval to interval it is important to make hypothetical associations between phenomena and parameters, and derive respective probabilities for these associations expressing their likelihood of being correct. This enables errors in monitoring evolution of phenomena to be reduced by the smoothing effects of determination over multiple intervals. Phenomena may evolve in any dimension or set of dimensions, e.g. space and/or time. The difficulty is that the number of hypothetical phenomenon/parameter associations in a real scenario, i.e. the number of possible combinations, increases exponentially with the number of phenomena, far exceeding the capacity of a conventional computer to deal with it in real time. In other words combinatorial complexity is too great for conventional signal processing.

An example of monitoring an evolving set of physical phenomena is referred to as tracking, and is known for a variety of applications. Tracking is commonly implemented in the case of spatial motion, e.g. radar monitoring of civil aircraft in flight. It may also be used in signal processing (e.g. speech recognition) for choosing between possible candidate points on a trajectory in a phase space and associated with a signal evolving with time. In the case of radar monitoring, the evolving set of physical phenomena is a set of radar target tracks and the parameters which are determined are measurements of target range and bearing made at regular time intervals by a radar system. The signal processing problem in this case is to determine assignments of successive sets of radar measurements to evolving target tracks and determine associated weights or probabilities indicating degree of assignment validity. The possibility must be also be taken into account that the measurements may include noise, false negatives (undetected targets) and false positives (wrongful detection of targets).

In IEEE Transactions on Aerospace and Electronic Systems, volume 31(1), pages 458-468, January 1995, B Zhou and N Bose disclose an algorithm for data association in multi-target tracking, i.e. tracking a number of targets using a number of measurements and hypothetical tracks. Given initial target positions and measurements of target positions (e.g. radar range and bearing measurements), the general approach of this and other prior art techniques is to derive hypothetical extensions for each track and accept, reject or average them on the basis of their probability. However, as Zhou et al. point out, unfortunately the number of feasible hypothetical track extensions grows very rapidly with increasing numbers of targets and measurements, much more so than can be accommodated in real-time signal processing at the present time. In consequence, research on multi-target tracking has given a lot of attention to improving computational efficiency, i.e. reducing the processing burden associated with hypothetical track extensions. The Zhou et al. approach is to compute a posteriori probabilities of the origins of measurements in the joint probabilistic data association filter. This results in a technique suitable for parallel processing.

U.S. Pat. No. 5,537,119 also discloses a technique for multi-target tracking. It again describes the basic approach of using measurements on multiple targets to derive possible tracks and associated probabilities or cost functions. This patent describes the basic technique of determining observation assignments by minimising a summation subject to constraints, the summation being of products of a track cost function, track/observation indices and a track observation assignment. It states that the only known method of solving this is by an approach referred to as "branch and bound", which introduces a workload unsuitable for real-time operation. Methods are discussed for reducing complexity by discarding potential tracks on the basis of probability, and also the iterative use of Lagrangian relaxation to reduce the dimensionality of the problem and identify which assignments to discard.

In "Multitarget-Multisensor Tracking: Principles and Techniques", 1995, Y Bar-Shalom and X-R Li disclose an approach to multi-target tracking. A respective set of measurements to locate tracks is made at each of a series of time instants. An individual target track is expressed as a set of hypothetical tracks each with a respective occurrence probability. Each hypothetical track is associated with a respective sub-set of the measurement set at any instant, and has association probabilities for respective measurements in the sub-set. Each association probability expresses the likelihood of the respective measurement and track being associated with one another. An important part of the multi-target tracking procedure is to generate an updated set of hypothetical tracks in response to input of each successive set of measurements.

SUMMARY OF THE INVENTION

It is an object of the inventive to provide an alternative form of signal processing with reduced combinatorial complexity.

The present invention provides a method of signal processing with reduced combinatorial complexity for evolving phenomena associated with obtainable parameters, the method including the steps of:

a) selecting from the phenomena a current phenomenon which is previously unprocessed by the method of the invention; and b) obtaining a parameter set associated with the current phenomenon; characterised in that the method also includes the steps of:

c) designating a start node as a parent node;

d) if there is a previously processed phenomenon with at least one existing node not yet treated as the parent node, treating the one such existing node as the parent node instead of the start node;

e) selecting a parameter from the parameter set;

f) producing a child node identity associated with the selected parameter;

g) representing child nodes of like identity for the selected phenomenon as a single node with multiple parameter relationships corresponding to parameters associated with at least one parent node;

h) representing child nodes with differing identities as separate nodes;
i) iterating e) to h) for other parameters in the set if available;
j) if there remain one or more existing nodes not yet treated as the parent node iterating d) to i) until none such remain;
k) iterating a) to j) for other phenomena in the set; and
l) deriving updated sets of parameter weights associated with respective phenomena by iterating over node relationships and identities.

The invention provides the advantage that its rate of growth of complexity as a function of number of phenomena is lower than that of comparable prior art equivalents, so it represents a lower signal processing burden.

The step of deriving updated sets of parameter weights for phenomena may comprise the steps of calculating for each phenomenon:
a) forward weights for the phenomenon's child nodes by summing forward weights for respective parent, grandparent etc. nodes (where available) weighted by associated phenomenon/parameter weights;
b) backward weights for the phenomenon's child nodes by summing forward weights for respective child of child, grandchild of child etc. nodes (where available) weighted by associated phenomenon/parameter weights;
c) a respective through node weight for each parameter relationship of each of the phenomenon's child nodes by multiplying its backward weight by a parameter weight obtained prior to updating and also by a summation of forward weights of the child node's parent nodes associated with that relationship; and
d) for each parameter associated with the phenomenon, a sum of the through node weights of the phenomenon's child nodes for the corresponding parameter relationship.

The method may include the step of normalising the parameter weights for each phenomenon by dividing each of them by their sum over all parameters associated with the phenomenon. The step of producing a child node identity may express it in terms of:
a) either parameters unavailable for use in connection with subsequently generated child node identities, or
b) parameters remaining available for such use.

The step of producing a child node identity may implemented by calculating an intersection of parameters assignable to subsequent phenomena (if unused) with a union of an identity of a parent node of a child node of the current phenomenon and a parameter expressing a relationship being implemented between the parent and child nodes in this iteration: i.e. representing set intersection and union operations by $\cap$ and $\cup$, then for a current phenomenon $T_j$, parameter $m_k$, accumulated measurements acc(j) and parent node identity $l_P$, the child identity $l_{Ch}$ is given by: $l_{Ch}=\text{acc}(j) \cap (l_P \cup m_k)$.

In a further aspect, the present invention provides a method of signal processing with reduced combinatorial complexity to determine trajectories for evolving physical phenomena associated with measurable parameters, the method including the steps of:
a) selecting from the phenomena a current phenomenon which is previously unprocessed by the method of the invention; and
b) measuring a parameter set associated with the current phenomenon; characterised in that the method also includes the steps of:
c) designating a start node as a parent node;
d) if there is a previously processed phenomenon with at least one existing node not yet treated as the parent node, treating the one such existing node as the parent node instead of the start node;
e) selecting a parameter from the parameter set;
f) producing a child node identity associated with the selected parameter;
g) representing child nodes of like identity for the selected phenomenon as a single node with multiple parameter relationships corresponding to parameters associated with at least one parent node;
h) representing child nodes with differing identities as separate nodes;
i) iterating e) to h) for other parameters in the set if available;
j) if there remain one or more existing nodes not yet treated as the parent node iterating d) to i) until none such remain;
k) iterating a) to j) for other phenomena in the set;
l) deriving updated sets of parameter weights associated with respective phenomena by iterating over node relationships and identities; and
m) determining respective trajectories for the phenomena from the updated sets of parameter weights.

In a different aspect, the present invention provides a method of signal processing with reduced combinatorial complexity to determine trajectories for evolving physical phenomena associated with obtainable parameters, the method including
a) associating child node identities with the parameters,
b) treating child nodes of like identity for a phenomenon as a single node with multiple parameter relationships corresponding to parameters associated with at least one parent node; and
c) representing child nodes with differing identities as separate nodes.

In a preferred embodiment, the present invention provides a method of tracking targets by radar to measure range and bearing parameters and determine associated evolving target tracks, the method including
a) measuring range and bearing parameters;
b) associating child node identities with the parameters,
c) treating child nodes of like identity for a target track as a single node with multiple parameter relationships corresponding to parameters associated with at least one parent node;
d) representing child nodes with differing identities as separate nodes;
e) determining updated probability association weights and associated measured parameter assignments for the relationships; and
f) modifying tracks to reflect the updated probability association weights and associated measured parameter assignments.

In another aspect, the present invention provides apparatus for signal processing with reduced combinatorial complexity for evolving phenomena comprising means for obtaining parameters associated with the evolving phenomena and computer apparatus programmed to:
a) select from the phenomena a current phenomenon which is previously unprocessed by the apparatus of the invention; and
b) obtain a parameter set associated with the current phenomenon; characterised in that the computer apparatus is also programmed to:
c) designate a start node as a parent node;

d) if there is a previously processed phenomenon with at least one existing node not yet treated as the parent node, treat one such existing node as the parent node instead of the start node;
e) select a parameter from the parameter set;
f) produce a child node identity associated with the selected parameter;
g) represent child nodes of like identity for the selected phenomenon as a single node with multiple parameter relationships corresponding to parameters associated with at least one parent node;
h) represent child nodes with differing identities as separate nodes;
i) iterate e) to h) for other parameters in the set;
j) if there remain one or more existing nodes not yet treated as the parent node iterate d) to i) until none such remain;
k) iterate a) to j) for other phenomena in the set; and
l) derive updated sets of parameter weights associated with respective phenomena by iterating over node relationships and identities.

In a further aspect, the present invention provides apparatus for signal processing with reduced combinatorial complexity for determining trajectories for evolving physical phenomena comprising means for obtaining parameters associated with the evolving physical phenomena and computer apparatus programmed to execute the steps of:
a) selecting from the phenomena a current phenomenon which is previously unprocessed by the apparatus of the invention; and
b) measuring a parameter set associated with the current phenomenon; characterised in that the computer apparatus is also programmed to execute the steps of:
c) designating a start node as a parent node;
d) if there is a previously processed phenomenon with at least one existing node not yet treated as the parent node, treating the one such existing node as the parent node instead of the start node;
e) selecting a parameter from the parameter set;
f) producing a child node identity associated with the selected parameter;
g) representing child nodes of like identity for the selected phenomenon as a single node with multiple parameter relationships corresponding to parameters associated with at least one parent node;
h) representing child nodes with differing identities as separate nodes;
i) iterating e) to h) for other parameters in the set if available;
j) if there remain one or more existing nodes not yet treated as the parent node iterating d) to i) until none such remain;
k) iterating a) to j) for other phenomena in the set;
l) deriving updated sets of parameter weights associated with respective phenomena by iterating over node relationships and identities; and
m) determining respective trajectories for the phenomena from the updated sets of parameter weights.

In still another aspect, the present invention provides apparatus for signal processing with reduced combinatorial complexity to determine trajectories for evolving physical phenomena comprising means for obtaining parameters associated with the evolving phenomena and computer apparatus programmed execute the steps of:
a) associating child node identities with the parameters,
b) treating child nodes of like identity for a phenomenon as a single node with multiple parameter relationships corresponding to parameters associated with at least one parent node; and
c) representing child nodes with differing identities as separate nodes.

In a preferred aspect, the present invention provides apparatus for tracking targets including radar apparatus for measuring range and bearing parameters and computer apparatus programmed to determine associated evolving target tracks by executing the steps of
a) associating child node identities with range and bearing parameters measured by the radar apparatus,
b) treating child nodes of like identity for a target track as a single node with multiple parameter relationships corresponding to parameters associated with at least one parent node;
c) representing child nodes with differing identities as separate nodes;
d) determining updated probability association weights and associated measured parameter assignments for the relationships; and
e) modifying tracks to reflect the updated probability association weights and associated measured parameter assignments.

In a further aspect, the present invention provides computer software for use in signal processing with reduced combinatorial complexity for evolving phenomena associated with obtainable parameters, the software incorporating instructions for controlling computer apparatus to execute the steps of:
a) selecting from the phenomena a current phenomenon which is previously unprocessed using the software of the invention; and
b) obtaining a parameter set associated with the current phenomenon; characterised in that the software also incorporates instructions for controlling computer apparatus to execute the steps of:
c) designating a start node as a parent node;
d) if there is a previously processed phenomenon with at least one existing node not yet treated as the parent node, treating the one such existing node as the parent node instead of the start node;
e) selecting a parameter from the parameter set;
f) producing a child node identity associated with the selected parameter;
g) representing child nodes of like identity for the selected phenomenon as a single node with multiple parameter relationships corresponding to parameters associated with at least one parent node;
h) representing child nodes with differing identities as separate nodes;
i) i) iterating e) to h) for other parameters in the set if available;
j) if there remain one or more existing nodes not yet treated as the parent node iterating d) to i) until none such remain;
k) iterating a) to j) for other phenomena in the set; and
l) deriving updated sets of parameter weights associated with respective phenomena by iterating over node relationships and identities.

In an alternative aspect, the present invention provides computer software for use in signal processing with reduced combinatorial complexity for evolving physical phenomena associated with obtainable parameters characterised in that it incorporates instructions for controlling computer apparatus to execute the steps of:
a) selecting from the phenomena a current phenomenon which is previously unprocessed using the software of the invention; and
b) measuring a parameter set associated with the current phenomenon; characterised in that the computer software also includes instructions for controlling computer apparatus to execute the steps of:

c) designating a start node as a parent node;
d) if there is a previously processed phenomenon with at least one existing node not yet treated as the parent node, treating the one such existing node as the parent node instead of the start node;
e) selecting a parameter from the parameter set;
f) producing a child node identity associated with the selected parameter;
g) representing child nodes of like identity for the selected phenomenon as a single node with multiple parameter relationships corresponding to parameters associated with at least one parent node;
h) representing child nodes with differing identities as separate nodes;
i) iterating e) to h) for other parameters in the set if available;
j) if there remain one or more existing nodes not yet treated as the parent node iterating d) to i) until none such remain;
k) iterating a) to j) for other phenomena in the set;
l) deriving updated sets of parameter weights associated with respective phenomena by iterating over node relationships and identities; and
m) determining respective trajectories for the phenomena from the updated sets of parameter weights.

In another aspect, the present invention provides computer software for use in signal processing with reduced combinatorial complexity to determine trajectories for evolving physical phenomena associated with obtainable parameters, characterised in that the computer software incorporates instructions for controlling computer apparatus to execute the steps of:

a) associating child node identities with the parameters;
b) treating child nodes of like identity for a phenomenon as a single node with multiple parameter relationships corresponding to parameters associated with at least one parent node; and
c) representing child nodes with differing identities as separate nodes.

In a preferred aspect, the present invention provides computer software for use in tracking targets by radar to measure range and bearing parameters and determine associated evolving target tracks, characterised in that the computer software incorporates instructions for controlling computer apparatus to execute the steps of:

a) associating child node identities with range and bearing parameters measured by radar,
b) treating child nodes of like identity for a phenomenon as a single node with multiple parameter relationships corresponding to parameters associated with at least one parent node;
c) representing child nodes with differing identities as separate nodes;
d) determining updated probability association weights and associated measured parameter assignments for the relationships; and
e) modifying tracks to reflect the updated probability association weights and associated measured parameter assignments.

The apparatus and computer software aspects of the invention may have preferred features corresponding to those of the method aspect.

DESCRIPTION OF THE FIGURES

In order that the invention might be more fully understood, embodiments thereof will now be described, by way of example only, with reference to the accompanying drawings, in which.

DETAILED DESCRIPTION OF THE INVENTION

Figure 1A:
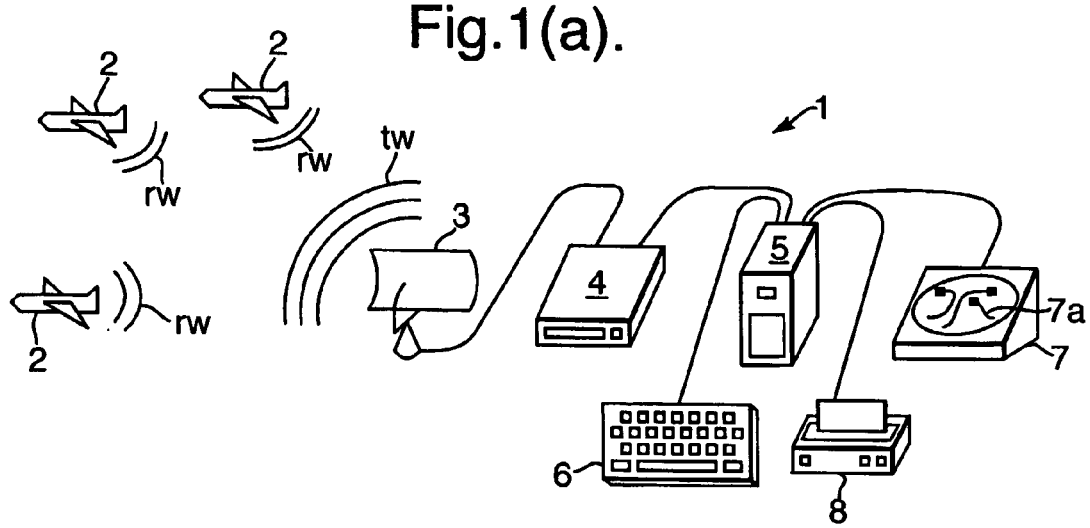
FIG. 1(a) schematically illustrates a radar system suitable for implementing the invention.

Referring to FIG. 1(a), a radar system suitable for implementing the invention is indicated generally by 1, and is shown monitoring aircraft 2. The radar system 1 has a radar antenna 3 connected to a signal processing unit 4, itself connected to a computer controlled by a keyboard 6. The computer 5 is connected to a visual display unit (VDU) and a printer 8. In operation of the radar system 1, an operator uses the keyboard 6 to control the computer 5, and via it the signal processing unit 4, to provide for control of the bearing on which the radar antenna 3 produces transmitted radar signals shown as waves tw. The transmitted radar signals tw are reflected from the aircraft 2 to provide radar return signals rw. Beamforming in radar, i.e. control of radar transmission and reception directions, is well known and will not be described.

The radar return signals rw are received by the radar antenna 3 and pass to the signal processing unit 4: here they are downconverted in frequency to baseband and converted from analogue signals to digital signal samples. Radar pulse time of flight and hence target aircraft range is obtained by the signal processing unit 4 by signal range gating, and target aircraft bearing is obtained from antenna reception direction, in a known manner in each case. The computer 5 runs software to implement automated target tracking in accordance with the invention (as will be described later in more detail) in order to determine target aircraft trajectories over a series of measurements of target aircraft range and target aircraft bearing. These trajectories, e.g. 7*a*, are displayed on the VDU 7 and may be printed out using the printer 8.

Figure 1B:
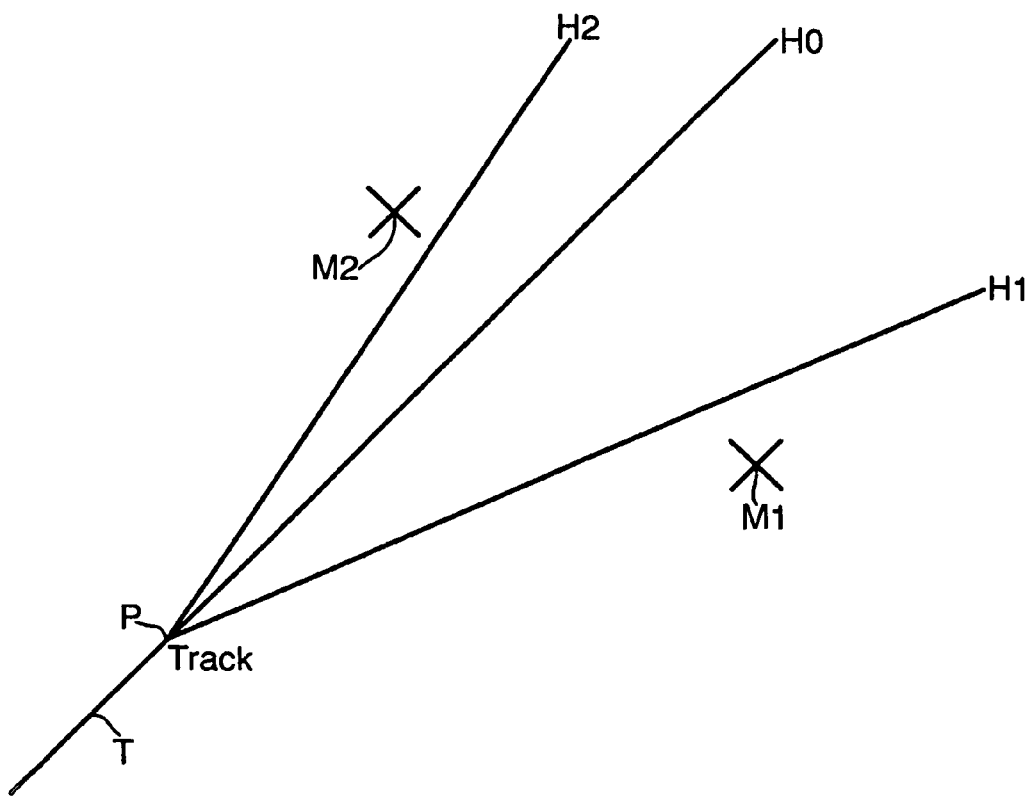
FIG. 1(b) is a simple representation of radar tracks and associated measurements made by the FIG. 1(a) radar system.

Referring now also to FIG. 1(*b*), which illustrates a very simple case, a radar track T previously determined up to a point P by the computer 5 requires prediction in the light of a set of new radar range and bearing measurements made by the radar system 1 and indicated by two points M1 and M2. One iteration of a tracking technique is required to predict a new extension to a track (not shown). Knowledge of target manoeuvring capability indicates that there are three hypothetical track components H0, H1 and H2 which are deducible as extensions based on the existing track T, the measurements M1 and M2 and a dummy measurement (not shown) indicating absence of detection or no measurement. The tracking problem is to distinguish between the hypothetical tracks H0 to H2 and obtain a new predicted track. In a real radar application there might be hundreds of tracks and thousands of measurements per measurement set.

Although it is possible to carry out target tracking on the basis of one input track per target as illustrated in FIG. 1(*b*), in practice multiple hypothetical input tracks (input track distribution) associated with respective occurrence probabilities are employed per target, and multiple hypothetical output tracks (output track distribution) and probabilities are predicted. This is because it is normally not possible to determine a track adequately from one measurement set, as the probability of the most probable hypothetical track may not differ greatly to those of others. Moreover, track probability may increase or reduce from one iteration to another. This makes it desirable to preserve a variety of possible tracks whose number and probabilities may vary between successive iterations. A target track therefore embraces a number of possibilities expressed as a set of hypothetical tracks or "components" each incorporating a respective occurrence probability or "weight". The target track therefore becomes represented by a vector of components, each component being associated with a respective weight expressing its probability. The weights sum to unity and each component is itself represented by a probability distribution such as a Gaussian function. Each component has a vector element representing its last determined position and a vector element representing the covariance of the vector elements of that position. The position is referred to in the art of tracking as a "mean", albeit strictly speaking it is not obtained by averaging over a set of position values, and the covariance represents its uncertainty. Each component also contains a weight together with a history of measurements (identified by measurement indices) with which the component has been inferred to be associated in the tracking process. It also has a history of models (e.g. straight, turning) which have been inferred as corresponding to shapes of parts of the component's trajectory between successive measurement sets.

There are normally multiple measurements of a track distribution at each iteration or time step: the number of measurements in each set obtained at each iteration is designated $N_M$ and the ith measurement is designated $z_i$. To model the fact that each track may have no associated measurement and consequently be undetected, a dummy measurement is introduced: i.e. i=0 is treated as associated with an undetected target. When i is in the range 1 to $N_M$, a target is treated as being detected and is associated with the ith measurement. The assignment of tracks to measurements is assumed to be susceptible to decomposition into an assignment for each of a number $N_T$ of tracks. The measurement to which the jth track is assigned is denoted $i_j$. As will be described later in more detail, gating is used to select a respective subset of the $N_M$ measurements for association with each track which are considered candidates for the assignment. Each subset is made up of the dummy and those measurements that lie in high probability regions of the respective target's likely location. This assignment of measurements can be represented as an indicator vector, $\Omega_j$, with $N_M+1$ elements $\omega_{ij}$:

$$\Omega_j = [\omega_{0j}, \omega_{1j}, \ldots, \omega_{N_M j}] \quad (1)$$

$$\text{where } \omega_{ij} = \begin{cases} 1 & i = i_j \\ 0 & i \neq i_j \end{cases} \quad (2)$$

$\omega_{ij}=1$ represents the ith track being assigned to the jth measurement; $\omega_{ij}=0$ the ith track is not so assigned; and $\omega_{0j}$ is 1 or 0 according respectively to whether or not a target is to be regarded as undetected, $\omega_{0j}=1$ indicating assignment to the dummy measurement.

The collective assignment for all tracks can then be represented as an indicator matrix, $\Omega$, where each row is an indicator vector $\Omega_j$ as above, and $\Omega$ is given by:

$$\Omega = [\Omega_1^T \ldots \Omega_{N_T}^T]^T \quad (3)$$

where superscript index T indicates a transpose.

It is assumed that each measurement is assigned either to no track or to one track, and that each track is assigned to no measurement or one measurement. These assumptions are reflected in Equation (4) and (5) below on the indicator matrix elements $\omega_{ij}$ with the exclusion of the first matrix column with elements of the form $\omega_{0j}$.

First assumption: for each individual measurement (specific value of i other than 0), the sum of matrix elements $\omega_{ij}$ for all the $N_T$ tracks must be less than or equal to 1, since each measurement is assigned to at most one track, i.e.:

$$\sum_{j=1}^{N_T} \omega_{ij} \leq 1, \quad i = 1 \ldots N_M \quad (4)$$

Second assumption: for each individual track (identified by a respective value of the index j), the sum of matrix elements $\omega_{ij}$ for all the $N_M$ measurements must be equal to 1, since each track is assigned to exactly one measurement (either an actual measurement or the dummy measurement). i.e.:

$$\sum_{i=0}^{N_M} \omega_{ij} = 1, \quad j = 1 \ldots N_T \quad (5)$$

Figure 2:
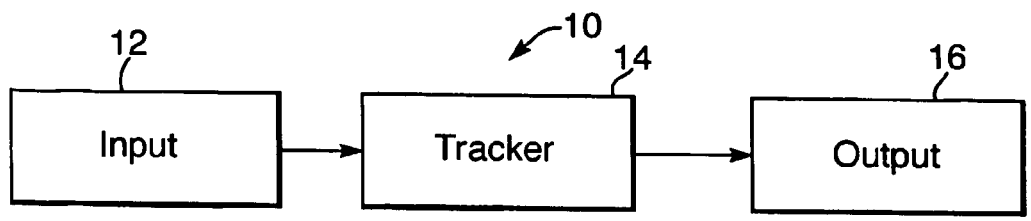
FIG. 2 shows a generalised prior art tracking system.

Referring now to FIG. 2, at a high level of generality, a prior art multi-target tracking system 10 comprises an input unit 12 such as a radar system providing a respective set of measurements for each system iteration. The measurement set passes to a tracker unit or computer 14, which uses it in conjunction with a track distribution previously derived for an immediately preceding iteration (input track distribution) to derive a new predicted track distribution (output track distribution). The output track distribution passes to an output 16 for display on a visual display unit (not shown). The system 10 iterates this process for successive sets of measurements. A sequence of sets of tracks is obtained in this way to provide plausible trajectories for targets inferred from the sequence of sets of measurements. The output 16 uses this sequence to display as target tracks.

Figure 3:
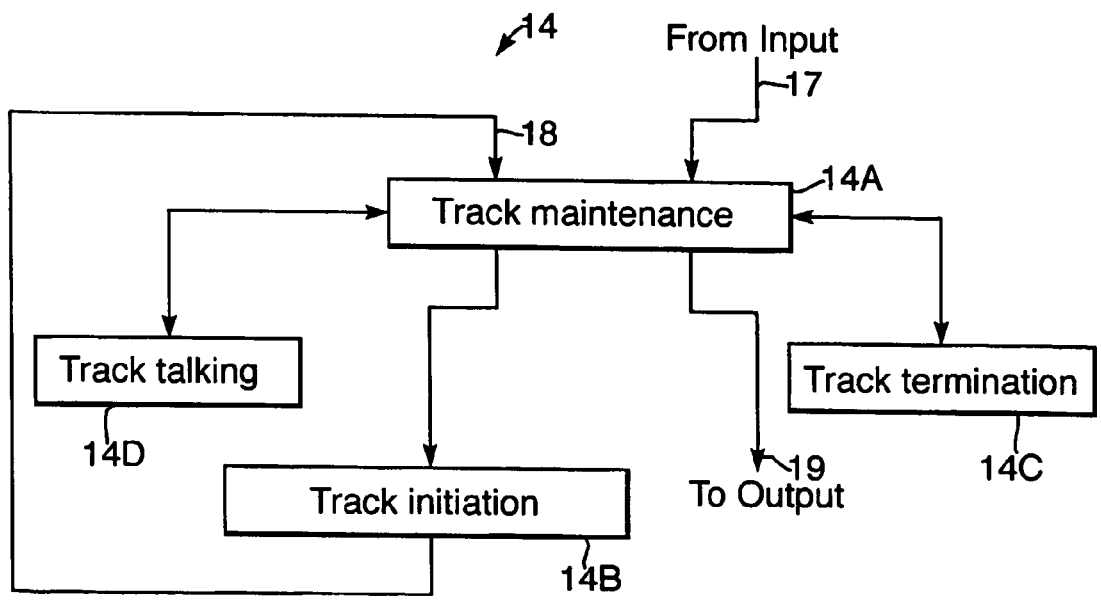
FIG. 3 is a block diagram of a prior art tracker shown in FIG. 2.

The function of the prior art tracker 14 is shown in more detail in FIG. 3. It incorporates computer software to implement four stages 14A to 14D. Stage 14A is a track maintenance stage which maintains and updates target tracks. At each time step or iteration of operation, track maintenance 14A receives input of a set of measurements of a track distribution at 17 and newly calculated hypothetical track components at 18 from stage 14B, a track initiation stage. The track maintenance stage 14A passes the track components to stage 14C, a track termination stage, and receives in response decisions on whether or not to terminate each track. It deletes tracks to be terminated, and selects a subset of the input set of measurements for use as candidate measurements for new tracks and passes them to the track initiation function 14B for use in the next iteration. The track initiation function 14B uses a sequence of such measurement subsets to derive new candidate tracks. From previous measurements, the track maintenance stage 14A obtained equivalent earlier track-measurement associations with probabilities given by weights. It outputs these associations and weights to stage 14D, a track talking stage, and receives in response updated equivalents. In the prior art, the function of the track talking stage 14D has proved difficult to implement in automated form using conventional computer techniques: this is because computation grows exponentially as the number of tracks increases. In the present invention this function is carried out by a new approach which reduces the computational burden, as will be described later in more detail.

For each track, the track maintenance stage 14A makes predictions of new track components, rejects or "gates" track components of insufficient probability, and updates an input track distribution to form an output track distribution. Each prediction calculation operates independently on each track component and calculates a respective weight. It takes the input track distribution and produces a revised track distribution for assessment by the gating process. Each component may be predicted according to a single transition model (such as a constant velocity model) or alternatively a number of components could be spawned (as in the interacting multiple model) and generalised pseudo Bayes algorithms, in which several transition models are used. The prediction could further be based on a linearisation as with the extended Kalman filter, or alternatively on a deterministic sampling scheme as with the Unscented Kalman Filter.

The gating process in the track maintenance stage 14A compares each measurement in the current measurement set with each track component in the revised track distribution obtained in the prediction process, and finds a respective subset of the measurements that are "near" to the track component. To determine whether or not a measurement is near to a track component, a model of the measurement scenario is used. The model expresses constraints that apply to the track. In monitoring civil aircraft by radar for example, the constraints would be associated with aircraft maximum and minimum velocity, rate of climb, dive, turn and bank. The gating process output is a respective subset of nearby or gated measurements inferred to be associated with each track component; each measurement has an associated weight, and the weights in each subset sum to unity. Each track component in the revised track distribution is now associated with a respective subset of measurements, and each output track distribution is then derived by the track maintenance stage 14A from these track components and their respective measurement subsets and passed to output at 19. There may be multiple track components that relate to the same measurement: in such cases the weight of the measurement is the sum of the weights of the components. Gating could be implemented by finding all measurements with a high likelihood based on the predicted track or a (single) Gaussian approximation to it.

Figure 4:
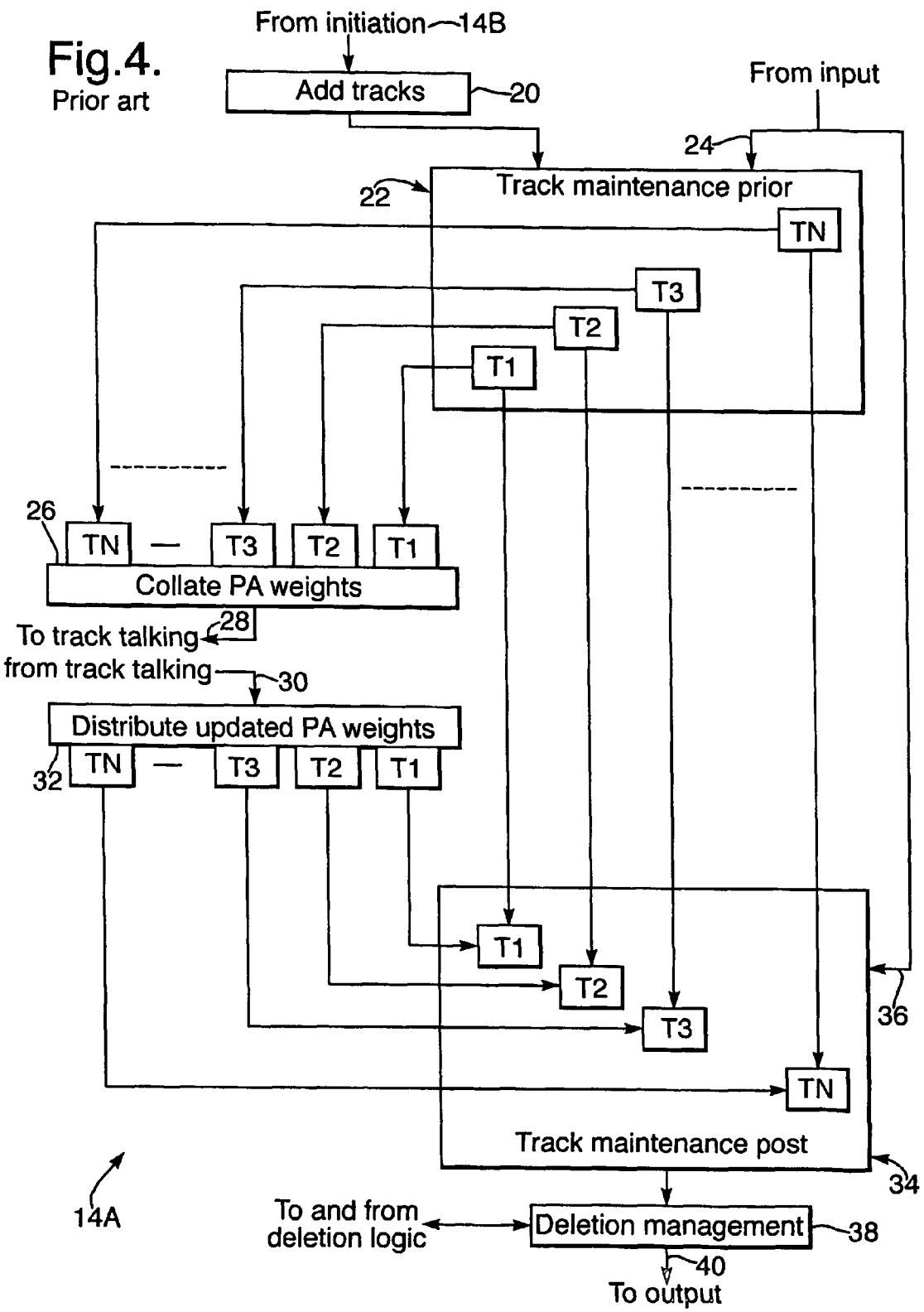
FIG. 4 is a block diagram showing in more detail a track maintenance stage appearing in FIG. 2.

Referring now also to FIG. 4, the track maintenance stage 14A is shown in more detail. New track components received from the track initiation stage 14B are input to an add tracks stage 20, which adds the components to a track database indicated by boxes labelled T1 to TN. A track maintenance prior stage 22 receives input of the current set of target measurements at 24 and all tracks in the database. For each track in the database, the track maintenance prior stage 22 conducts a step referred to as single track, track maintenance prior: this step takes the track in each case and modifies it by predicting it forward in time to the time of the current input measurements. For each track this step outputs a modified track and weights indicating probabilities of association of the track with measurements in a subset of the current input measurements. This indicates a subset of $N_M$ current input measurements which apply to the track, so that measurements outside the subset need not be considered further for this particular track to reduce computation. The subset for each track includes an element corresponding to the j=0 index associated with no measurement being applicable to the track.

Probability association (PA) weights and measurements associated with a current track passes to a collate PA weights stage 26, which collates the weights and passes them at for updating by the track talking stage 14D. Updated weights return at 30 from the track talking stage 14D. They pass to a distribute updated PA weights stage 32, which distributes them appropriately between tracks T1 to TN and passes them to a track maintenance post stage 34. It is not essential to use earlier weights in generating updated equivalents, the latter may be derived independently as will be described later.

The current set of measurements are also input at 36 to the track maintenance post stage 34, which also receives input of the modified tracks produced by the track maintenance prior stage 22. For each track, the track maintenance post stage 34 conducts a step referred to as single track, track maintenance post: this step updates the track on the basis of the measurements using the updated weights.

Each track updated at 34 is added to the track database and also passes to a deletion management stage 38, which sends it to the track termination stage 14C for a decision on whether or not it is to be terminated. Tracks for which the decision is to terminate are removed from the track database. The deletion management stage 38 then outputs the tracks remaining in the track database at 40.

Figure 5:
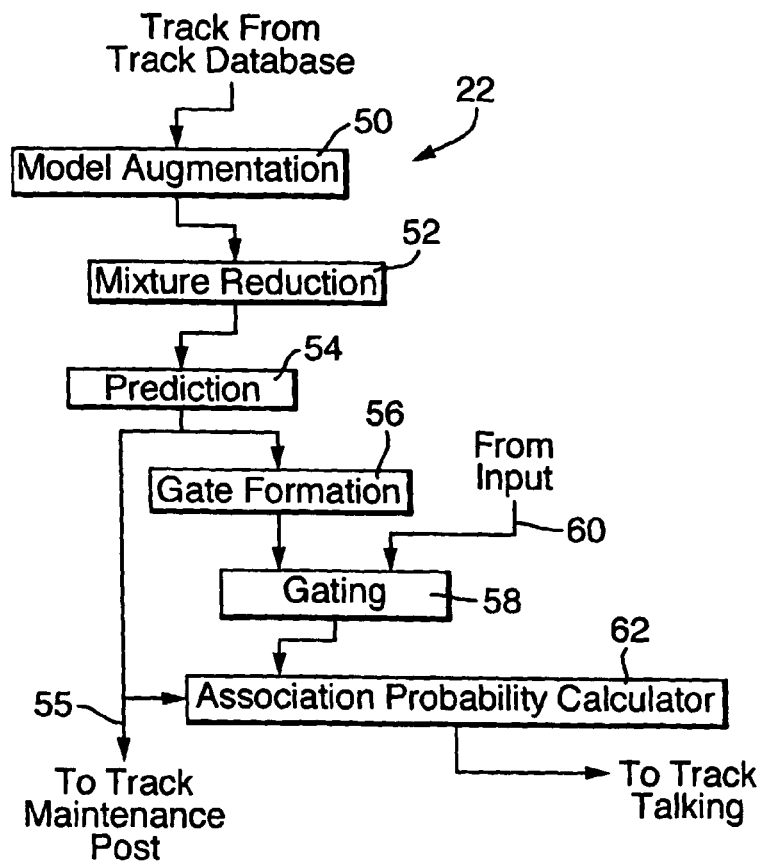
FIGS. 5 and 6 are block diagrams showing in more detail track maintenance stage prior and track maintenance post stages appearing in FIG. 4.

FIG. 5 shows the track maintenance prior stage 22 in more detail. It has a model augmentation stage 50 which takes an input track from the database and modifies it to reflect ambiguity over which tracking model or models could be relevant to it. In a radar example, a target turning or a target continuing in a straight line would be relevant models, and the possibility of both must be preserved if one cannot be eliminated by measurement or constraint. A modified track is output to a mixture reduction stage 52, which simplifies the representation of the track so as to avoid a combinatorial explosion over the number of models that are active over the history of the track: i.e. if there are p models and tracking has been carried out over q time steps, there are $p^q$ possibilities per track, which grows exponentially with time.

The track input from stage 50 is modified, and the modified track is output to a prediction stage 54. The prediction stage 54 uses the tracking models assumed to be relevant to predict the track forwards in time, and passes the resulting track to a gate formation stage 56. The gate formation stage 56 takes the track from stage 54 and forms a gate or gating region which defines a measurement space region in which it is likely that measurements relating to this track will be. The gating region so produced and the associated track is output to a gating stage 58, which also at 60 receives the current set of measurements from the input to the track maintenance prior stage 22. The gating 58 determines which of the measurements are gated, i.e. within the gating region, and which are not: the gated measurements are output with the associated track, but those outside the gating region are not.

An association probability calculator stage 62 takes the set of gated measurements and the associated track and derives from them probability association weights and a modified track that includes ambiguity regarding to which measurement the track is assigned. The weights provide probabilities that respective gated measurements are associated with the track, and a probability that none of the measurements is associated with the track. Weights and associated modified tracks are output as described earlier.

Figure 6:
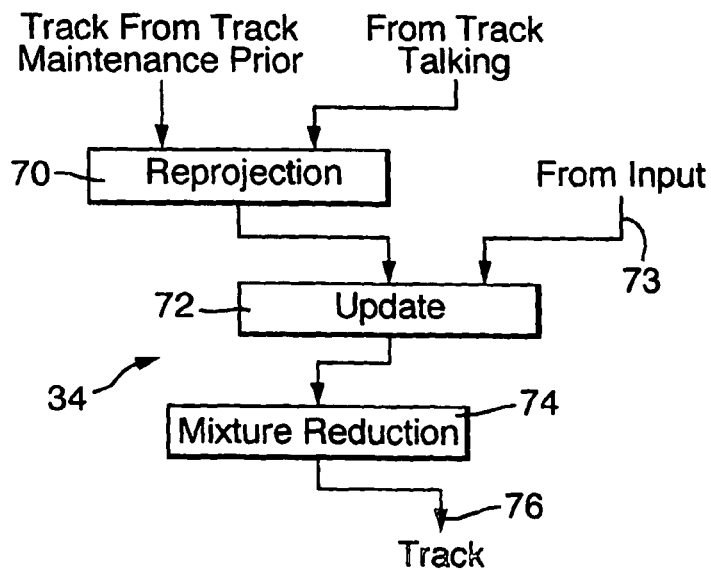

FIG. 6 shows the track maintenance post stage 34 in more detail. It has a reprojection stage 70 which takes each track and its respective updated probability association weights and associated measurement assignments and modifies the track to reflect the updating. The track so modified and the current set of measurements pass to an update stage 72, which updates the track on the basis of the current set of measurements received at 73. The updated track is processed in a mixture reduction stage 74, which simplifies the track's representation to avoid a combinatorial explosion over the history of associations of a track with measurements that relate to the track: i.e. if there are p measurements and tracking has been carried out over q time steps, there are $p^q$ possibilities per track, which grows exponentially with time. A modified version of the updated track is output.

Figure 7:
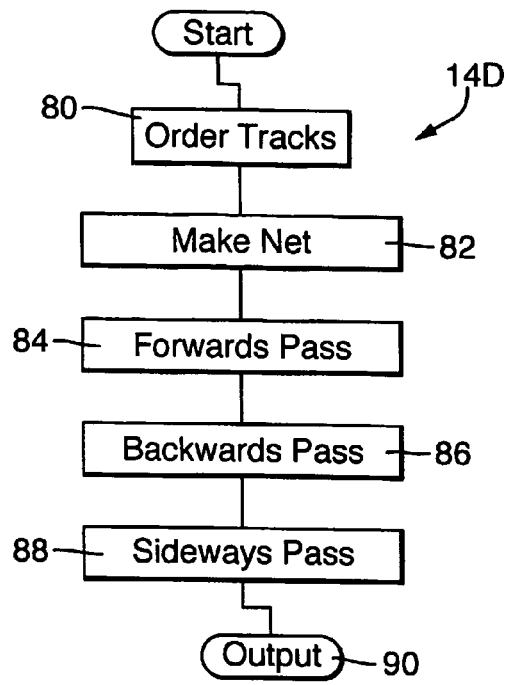
FIG. 7 is a block diagram of a computer-implemented process of the invention for updating probabilistic association vectors for use in the FIG. 4 track maintenance stage.

FIG. 7 is a block diagram of a series of computer-implemented (automated) stages or steps providing a track talking stage 14D of the invention. It includes an order tracks stage 80 which receives input of probability association weights and measurements for respective tracks. It creates for each track a respective vector, which is defined for the purposes of this specification as a probabilistic association vector: this vector has elements each of which is a combination of a measurement index identifying a measurement and a weight indicating the probability that the measurement is associated with the track. It generates a list of probabilistic association vectors for respective tracks and reorders them in a way that is advantageous for its subsequent stages. Each probabilistic association vector is labelled to indicate its place prior to reordering to relate the reordered list to that prior to reordering. The reordered list is used in a "make net" stage 82, which is an important feature of the invention because it reduces computational burden significantly. The stage 82 produces what is referred to herein as a net representation that makes it possible to calculate quantities of interest more efficiently. This will be described later in more detail. The reordered list of vectors and the net are used in a forwards pass stage 84, which recurses down the net generating downward probabilities associated with nodes of the net as it proceeds. This generates a first set of updated node probabilities. A backwards pass stage 86 also uses the reordered list of vectors and the net, and it recurses in a reverse direction, i.e. up the net, generating upward probabilities associated with nodes of the net as it proceeds. The backwards pass stage 86 generates a second set of updated node probabilities. Both sets of probabilities associated with nodes are used in a sideways pass stage 88, which processes them to generate updated probabilistic association vectors for output at 90 to the track maintenance stage 14A.

A tracking system such as a radar produces a series of measurements each of which is a vector comprising an estimate of a range of a target from the radar and the bearing of the target from the radar with respect to North. The ith measurement at time t is a vector $z_i(t)$ having two elements, range $z_i(1,t)$ and bearing $z_i(2,t)$.

As has been said, a-track is represented as a set of components which are candidate tracks or possible tracks. The track itself is represented mathematically as a vector of components each incorporating a weight or occurrence probability and associated with a history of measurements, a history of models and a mean and a covariance. The covariance of a vector is a matrix having diagonal elements which are squares of standard deviations of respective elements of the vector. The matrix has off-diagonal elements which are correlations between pairs of elements of the vector, i.e. matrix element $m_{ij}$ is the correlation between vector elements $v_i$ and $v_j$. The jth track has $L_j$ components. The kth of the components for the jth track has a mean which is a 4×1 vector $m_{j,k}$ and a covariance which is a 4×4 matrix, $C_{j,k}$. The mean has vector elements which are x-position, x-velocity, y-position and y-velocity in a two-dimensional Cartesian co-ordinate system. Velocity is not measured directly: it is deduced from the sequence of positions indicated by successive x and y values. A component's weight is $w_{j,k}$ and the weights for each track's components sum to unity, i.e.:

$$\sum_{k=1}^{L_j} w_{j,k} = 1, \quad j = 1 \ldots N_T \tag{6}$$

The track termination stage 14C is a published technique, see Bar-Shalom et al. mentioned above. It determines whether or not a track should be deleted by calculating the determinant of the overall covariance of the track. The overall track covariance $C_j$ is calculated from its components' weights $W_{j,k}$, means $m_{j,k}$, and covariances $C_{j,k}$, as follows:

$$C_j = \sum_{k'} w_{j,k'}(m_{j,k'} - m_j)(m_{j,k'} - m_j)^T + C_{j,k'} \tag{7}$$

where $$m_j = \sum_{k'} w_{j,k'} m_{j,k'}$$

is the overall track mean value and superscript T indicates a transpose as before.

If the determinant $|C_j|$ of matrix $C_j$ is greater than a determinant $|C_T|$ of a comparison matrix $C_T$ then the track is deleted. $C_T$ is chosen by experience: i.e. the process of the invention is run with a series of trial values of $C_T$, and the value giving optimum results is chosen.

The track initiation stage 14B is available in published literature, see Bar-Shalom et al. mentioned above. It stores a current set of measurements and a set of measurements input in a time step (t−1) immediately preceding the current time step (t). It initiates tracks on "nearby" pairs of measurements, each pair containing one measurement from each of the two sets: here the expression "nearby" means that the two measurements in a pair have between them a Mahalanobis distance which does not exceed a threshold. The Mahalanobis distance $d_{ii'}$ of the ith measurement $z_i(t)$ in the current measurement set at time (t) to the i'th measurement $z_{i'}(t-1)$ in the preceding set at time (t−1) is defined as:

$$d_{i:i'} = (z_i(t) - z_{i'}(t-1))^T N^{-1} (z_i(t) - z_{i'}(t-1)) \tag{8}$$

where N is a covariance matrix that weights bearing and range. N is chosen by experimentation by running the process of the invention using a set of trial values and selecting the value giving optimum results. The criterion for an acceptable measurement pair as a candidate for use in track initiation is:

$$d_{i:i'} \leq d_N \tag{9}$$

where $d_N$ is the Mahalanobis distance threshold referred to above: $d_N$ is chosen by experimentation as indicated for earlier quantities such as N. All pairs of measurements from the two sets are considered in turn. When a pair is found to be nearby, both corresponding measurements are no longer considered candidates for initiation of additional new tracks; this prevents multiple tracks being initialised using the same measurement. For each pair of measurements accepted as candidates for use in initiation, a respective track is produced and passed to the track maintenance stage 14A as discussed earlier.

Initiation tracks are estimated from nearby measurement pairs using a published least squares approach, see Bar-Shalom et al. above. Given a nearby pair consisting of a measurement z(t) at time (t) and a measurement z(t−1) at time (t−1), a track is initiated as a new single component which is a line through the measurement pair and has a mean m and a covariance C, where:

$$m = A \begin{bmatrix} \overline{H} \\ \overline{H}A \end{bmatrix}^{\dagger} \begin{bmatrix} x(t-1) \\ x(t) \end{bmatrix} \tag{10}$$

$$C = A \begin{bmatrix} H(\overline{H}^T x(t-1)) \\ H(\overline{H}^T x(t))A \end{bmatrix}^{-1} \begin{bmatrix} R & 0 \\ 0 & R \end{bmatrix} \begin{bmatrix} H(\overline{H}^T x(t-1)) \\ H(\overline{H}^T x(t))A \end{bmatrix}^{-1T} A^T \tag{11}$$

where $M^{\dagger} = (MM^T)^{-1}M^T$ is the pseudo-inverse of matrix M, M representing the first matrix (involving $\overline{H}$) on the right hand side of Equation (10); R is a covariance matrix of measurement noise, which defines the accuracies of the measurements of bearing and range, superscripts T, −1 and −1T represent a transpose, an inverse and a transpose of an inverse respectively, and:

$$x(t-1) = \begin{bmatrix} z(1, t-1)\sin(z(2, t-1)) \\ z(1, t-1)\cos(z(2, t-1)) \end{bmatrix} \tag{12}$$

$$x(t) = \begin{bmatrix} z(1, t)\sin(z(2, t)) \\ z(1, t)\cos(z(2, t)) \end{bmatrix} \tag{13}$$

i.e. x(t) and x(t−1) are Cartesian equivalents of the polar co-ordinate vectors z(t) and z(t−1) (range/bearing) defined earlier.

$$\overline{H} = \begin{bmatrix} 1 & 0 & 0 & 0 \\ 0 & 0 & 1 & 0 \end{bmatrix} \tag{14}$$

$$H(w) = \begin{bmatrix} \dfrac{w(1)}{\sqrt{w(1)^2 + w(3)^2}} & 0 & \dfrac{w(3)}{\sqrt{w(1)^2 + w(3)^2}} & 0 \\ \dfrac{w(3)}{w(1)^2 + w(3)^2} & 0 & \dfrac{w(1)}{w(1)^2 + w(3)^2} & 0 \end{bmatrix} \tag{15}$$

where w(1) and w(3) are respectively first and third elements in a vector w, and w represents any expression within parenthesis immediately following H.

$$A = \begin{bmatrix} 1 & T & 0 & 0 \\ 0 & 1 & 0 & 0 \\ 0 & 0 & 1 & T \\ 0 & 0 & 0 & 1 \end{bmatrix} \tag{16}$$

where T is the time difference between measurements z(t) and z(t−1) in units of a sampling interval. As has been said the mean of a component vector has four elements, x-position, x-velocity, y-position and y-velocity. The target velocity $V_t$ at time (t) is assumed equal to that at (t−1) (constant velocity model). The position for the track at time (t) is derived from the position at time (t−1) from a vector sum of the product vector $V_t T$ with the vector representing the (t−1) position. There are four measurements and four unknowns, the positions and velocities at time t−1, which are here assumed to define the positions and velocities at time t; the motion is assumed deterministic for the initiation. Four equations in four unknowns are solvable for the unknowns. The new track generated in track initiation (a single component) is the line joining the positions at times (t) and (t−1). It is assigned a weight of 1.0, and given a measurement association history and a model history which both have no entries.

More detailed descriptions of process stages described earlier will now be given. Model augmentation 50 (see FIG. 5) is part of track maintenance prior 22, which itself is part of track maintenance. Two dynamic models, models 1 and 2, are disclosed in published literature for radar target tracking (see Bar-Shalom et al. mentioned above): model 1 caters for straight line target motion and model 2 caters for target turns. Transitions between models 1 and 2 are governed by a 2×2 Markov switching matrix with elements p(a|b), where the abth element is the probability of switching to model a (after) from model b (before).

Model augmentation 50 considers each current component in the track in turn in order to generate a modified version of the track, in which two new components result from each current component because two models are in use.

More generally there will be as many new components per current component as there are models. As has been said, each component contains vector elements representing its evolution over time, element mean and covariance, and weight. It also contains histories of measurements associated with it and models (e.g. straight, turning) of successive parts of its trajectory. The first new component generated in model augmentation 50 is largely a copy of the elements of the associated current component, except that it has a model history which is that of the current component extended with model 1 and a weight which is the current component's weight multiplied by p(1|b). Here b is the most recent model in the original components' model history, and p(1|b) is the probability of switching to model 1 from model b and is taken to be unity if the model history is empty. The second new component is also largely a copy of the elements of the associated current component, except that it has a model history extended with model 2 and a weight which is the current component's weight multiplied by p(2|b). Once all the components have been so processed, the weights of all the new components are then normalised to sum to unity by dividing each of them by the sum of all.

The model augmentation step 50 is followed by the mixture reduction stage 52, which is implemented by an approach disclosed in published literature and referred to as an interacting multiple model. See Bar-Shalom et al. mentioned above. New components generated in the model augmentation step 50 are divided into individual sub-sets S such that all the components in each sub-set share the same most recent element in their model history and the same measurement association history. Empty association histories are taken to be the same. Components with no model history element the same as that of another are taken to be different to all other components. For components so selected in the sub-set S each indicated by a respective component index k', a respective overall sub-set weight $w_{j,S}$, mean $m_{j,S}$ and covariance $C_{j,S}$ are calculated from equivalents for those components as follows:

$$w_{j,S} = \sum_{k' \in S} w_{j,k'} \tag{17}$$

$$m_{j,S} = \sum_{k' \in S} w_{j,k'} \hat{m}_{j,k'} \tag{18}$$

$$C_{j,S} = \sum_{k' \in S} w_{j,k'} (\hat{m}_{j,k'} - m_{j,S})(\hat{m}_{j,k'} - m_{j,S})^T + C_{j,k'} \tag{19}$$

where k'∈S means the summation is only over components selected for the sub-set S (not necessarily in sequence because of the selection process), and $\hat{m}_{j,k}$ and $\hat{C}_{j,k}$ are the mean and covariance of the kth predicted new component obtained for the track in model augmentation 50. Equations (17) to (19) give the weight, mean and covariance of a mixture-reduced component which replaces the subset of components. The mixture-reduced component has a measurement association history which is the common association history of the sub-set components, and a model history which is their common most recent model history element. This is repeated for the other sub-sets of the track, and then for other tracks. It results in the number of components per track being reduced to the number of sub-sets S.

The mixture reduction stage 52 is followed by the prediction step 54. Mean $m_{j,k}$ and covariance $C_{j,k}$ obtained for each track in mixture reduction 52 are predicted forwards in time to obtain further predicted equivalents $\hat{m}_{j,k}^F$ and $\hat{C}_{j,k}^F$ using Kalman filter relations published by Bar-Shalom et al. mentioned above, and this is implemented according to a constant velocity model from the same publication as follows:

$$\hat{m}_{j,k}^F = A m_{j,k} \tag{20}$$

$$\hat{C}_{j,k}^F = A C_{j,k} A^T + Q_{j,k} \tag{21}$$

where superscript index T indicates a transpose and:

$$A = \begin{bmatrix} 1 & T & 0 & 0 \\ 0 & 1 & 0 & 0 \\ 0 & 0 & 1 & T \\ 0 & 0 & 0 & 1 \end{bmatrix} \tag{22}$$

$$\text{and } Q_{j,k} = \begin{bmatrix} \frac{T^3}{3} & \frac{T^2}{2} & 0 & 0 \\ \frac{T^2}{2} & T & 0 & 0 \\ 0 & 0 & \frac{T^3}{3} & \frac{T^2}{2} \\ 0 & 0 & \frac{T^2}{2} & T \end{bmatrix} \sigma_{j,k}^2 \tag{23}$$

where T is the time between the two most recent sets of measurements and $\sigma_{j,k}^2$ is a parameter indicating the size of the deviations from straight line motion: $\sigma_{j,k}^2$ is arrived at by experimentation with trial values to determine optimum values. Its value for a component with a most recent model history element of model 1 (turn) taken to be 100 times larger than its value when that element is model 2 (straight line). Predictions produced at 54 are output to the gate formation stage 56, to an association probability calculator stage 62 and at 55 to track maintenance post 34 (not shown).

Calculations in the gate formation and gating stages 56 and 58 are as follows. For each component, a predicted measurement $\hat{Z}_{j,k}$ and associated covariance is $\hat{S}_{j,k}$ is calculated using Kalman filter equations published by Bar-Shalom et al. mentioned above, as follows:

$$\hat{z}_{j,k} = h(\hat{m}_{j,k}^F) \tag{24}$$

$$\hat{S}_{j,k} = H(\hat{m}_{j,k}^F) \hat{C}_{j,k}^F H(\hat{m}_{j,k}^F)^T + R \tag{25}$$

where $\hat{m}_{j,k}^F$ and $\hat{C}_{j,k}^F$ were obtained from Equations (20) and (21), R is the covarian matrix of measurement errors and in the case of measurements of range and bearing (in radians):

$$h(x) = \begin{bmatrix} \sqrt{x(1)^2 + x(3)^2} \\ \tan^{-1} \frac{x(3)}{x(1)} \end{bmatrix} \tag{26}$$

where $x = \hat{m}_{j,k}^F$, where x(1), x(2) and x(3) are the first second and third elements of vector x, x(1) is x position, x(2) is x-velocity and x(3) is y-position; x also has a fourth element (x(4) which is y-velocity and H(x) is a matrix which is the derivative of h(x) with respect to x. Each element in H(x) is the derivative of an element of the measurement with an element of the state, so the elements in the first row are the derivatives of the range with respect to the x-position (x(1)), x-velocity (x(2)), y-position (x(3)) and y-velocity (x(4)) and similarly for the second row (bearing):

$$H(x) = \begin{bmatrix} \frac{x(1)}{\sqrt{x(1)^2 + x(3)^2}} & 0 & \frac{x(3)}{\sqrt{x(1)^2 + x(3)^2}} & 0 \\ \frac{x(3)}{\sqrt{x(1)^2 + x(3)^2}} & 0 & \frac{x(1)}{\sqrt{x(1)^2 + x(3)^2}} & 0 \end{bmatrix} \quad (27)$$

The gating process uses the values obtained from Equations (24) and (25) to define a set of regions in a measurement space: each region is centred on a respective predicted measurement $\hat{z}_{j,k}$ and has a region boundary established by the covariance $\hat{S}_{j,k}$ associated with that measurement. As indicated earlier the indices j, k indicate a measurement etc. being associated with the kth component of the jth track. There is one such predicted measurement and covariance for each component. To establish whether or not the ith measurement $z_i$ is within a gate associated with the kth component of the jth track, a Mahalanobis distance $d_{j,k:i}$ (a known mathematical quantity) is calculated for that component using the following expression:

$$d_{j,k:i} = (z_i - \hat{z}_{j,k})^T \hat{S}_{j,k}^{-1} (z_i - \hat{z}_{j,k}) \quad (28)$$

$d_{j,k:i}$ is not greater than a predetermined threshold $d_T$, the measurement is taken to be in the gate of the component. A measurement is taken to be in the gate for a track if it is in the gate of any of the track's components. The threshold $d_T$ is determined using a series of trial values in the process of the invention and selecting a value which experience shows gives optimum results.

The association probability calculator stage 62 follows the gating stage 58. A probabilistic association vector is a vector of probabilistic associations: it has elements each of which is a measurement and an associated weight giving a probability that the measurement is associated with a track under consideration. The measurements are those which have survived the gating stage 58 together with a dummy measurement associating the track with no measurement. The probabilistic association vector for a track covers all the track's components in terms of association of the track with measurements. Multiple components may contribute to the same element in the probabilistic association vector if they have the same association history but a different model history.

To calculate a weight $p(\omega_{j,i})$ for the ith measurement in the probabilistic association vector of the jth track, this vector is calculated for each component of a track. The probabilistic association vector of the track itself is the sum of the probabilistic association vectors for the track's components each weighted by the respective component's weight. The weights of the elements of the probabilistic association vector for the track are then normalised to sum to unity across the vector by dividing each of them by their total sum.

For each component of a track, a respective probabilistic association vector is to be calculated. Elements of this vector are calculated by firstly estimating a clutter density as in the non-parametric probabilistic data association filter (PDAF) published by Bar-Shalom et al. mentioned above. The clutter density is estimated as being the total number N of measurements in the gates (see stages 56/58) of all components of the track divided by the volume of the largest gate (as described earlier, a gate is considered to have a volume or gating region which defines a measurement space region within which acceptable measurements for the corresponding component must lie). The gate volume $V_{j,k}$ associated with the kth component of the jth track is given by:

$$V_{j,k} = C_{n_z} d_T^{n_z} 2\sqrt{|\hat{S}_{j,k}|} \quad (29)$$

where $C_{n_z}$ is the volume of the unit (radius) hypersphere in a measurement space having $n_z$ dimensions; in the case of measurements with two dimensions, bearings and range, $n_z=2$, and $C_{n_z}$ is equal to $\pi r^2$, i.e. $\pi$ for r=1.

The probabilistic association vector of the kth component of the jth track has a dummy measurement weight $W_{ND}$ (ND=no detection) and a weight $W_{j,k:i}$ for an association to ith measurement $z_i$ as follows:

$$w_{ND} = (1 - P_D P_G)\left(\frac{1}{V_{MAX}}\right)^N \quad (30)$$

$$w_{j,k:i} = P_D \left(\frac{1}{V_{MAX}}\right)^{N-1} N(z_i; \hat{z}_{j,k}, \hat{S}_{j,k}) \quad (31)$$

where $P_D$ is the probability of detection, $P_G$ is the gate probability, i.e. the Chi-Squared cumulative distribution function (CDF) with $n_z$ degrees of freedom evaluated at $d_T$, $V_{MAX}$ is the largest value of $V_{j,k}$ for all components (index k) of the jth track, N is the number of measurements in the gate, and $N(z_i; \hat{z}_{j,k}, \hat{S}_{j,k})$ is the multivariate Normal distribution evaluated at $z_i$. The probabilistic association vector of the track itself is the sum of the probabilistic association vectors for the track's components each weighted by the respective component's weight. The weights of the elements of the probabilistic association vector for the track are then normalised to sum to unity across the vector by dividing each of them by their total sum. This produces normalised weights $p(\omega_{j,i})$ as described in the prior art by Bar-Shalom et al, and not described in detail here.

A multivariate Normal distribution N(x;m;C) with mean m and covariance C evaluated at x is defined in the prior art as follows:

$$N(x; m, C) = \frac{1}{|2\pi C|^{1/2}} \exp\left\{-\frac{1}{2}(x-m)^T C^{-1} (x-m)\right\} \quad (32)$$

Substitution of $z_i$, $\hat{z}_{j,k}$ and $\hat{S}_{j,k}$ for x, m and C respectively in Equation (32) gives the required $N(z_i; \hat{z}_{j,k}, \hat{S}_{j,k})$.

The track maintenance post stage 34 will now be described in more detail. In its reprojection stage 70, for each component in the track, a probabilistic association vector is calculated as previously described. The track's probabilistic association vector is also calculated as previously described from its components' probabilistic association vectors.

For each pairing of a component of a current track with an element in the current track's probabilistic association vector, a respective new component is generated in modifying the current track in the track maintenance post stage 34. Since the probabilistic association vector elements contain measurement indices for all measurements within the current track's gate, the number of new components for each track is the product of the number of current track components and the number of measurements within the respective gate. The model history, mean and covariance of each new component are those of the respective current component. The association history of each new component is that of the respective current component augmented with the association corresponding to the measurement in the associated element in the probabilistic association vector.

To derive the weight of each new component, a weight is employed of an associated element of an associated updated probabilistic association vector obtained in track talking 14D by modifying the probabilistic association vector used earlier in this stage 34. The associated element of the associated updated probabilistic association vector is that having the same measurement index as the probabilistic association vector but modified weight. The weight of each new component is then calculated as the weight of the respective current component multiplied by the weight of the associated element in the component's probabilistic association vector multiplied by the track's associated element ratio. The track's associated element ratio is the ratio of the weight of the associated element in the track's probabilistic association vector to the weight of the associated element in the track's updated probabilistic association vector. Repeating this for each pairing of a current track component and current track probabilistic association vector element produces a set of new components for the track, and then the whole procedure is repeated for all tracks.

The update stage 72 follows the gating stage 70. For each component in the track, the update stage 72 uses Kalman filter update equations published by Bar-Shalom et al. mentioned above. The next step is to calculate a new mean $m_{j,k}{}^C$ and covariance $C_{j,k}{}^C$ from predicted equivalents derived earlier—see Equations (21), (22), (25) and (26). If the association relates to a measurement, $z_i$ (as opposed to no detection being inferred), the following equations are used for these calculations:

$$m_{j,k}{}^C = \hat{m}_{j,k}{}^F + {}_{xz}\hat{S}_{j,k}(z_i - \hat{z}_{j,k}) \tag{34}$$

$$C_{j,k}{}^C = \hat{C}_{j,k}{}^F - P_{xz}\hat{S}_{j,k}{}^{-1}P_{xz}{}^T \tag{35}$$

where $$P_{xz} = \hat{C}_{j,k}{}^F H(\hat{m}_{j,k}{}^F)^T \tag{36}$$

If the association inferred is that no detection took place then:

$$m_{j,k}{}^C = \hat{m}_{j,k}{}^F \tag{37}$$

$$C_{j,k}{}^C = \hat{C}_{j,k}{}^F \tag{38}$$

The mixture reduction stage 74 follows the update stage 72. In accordance with Bar-Shalom et al. mentioned above, for each track, respective sub-sets of track components are defined by the two criteria that all components in a set that have the same model history and the same most recent element in their association histories (so are attributed to the same measurement). Mixture reduction Equations (18) to (20) are used to deduce the weight, mean and covariance of each of these sub-sets of components. A modified track is then produced which contains components each associated with a respective sub-set. The weight, mean, covariance and model history of each component are taken to be those of its sub-set. The association history of the sub-set is simply the most recent association common to the components.

For illustrational purposes, a description of a simplified track talking procedure will be given, with four target tracks and four radar measurements treated as being real and one as a dummy (no detection) measurement. The real measurements are indexed 1, 2, 3 and 4 respectively and the dummy measurement is indexed 0 as before. The gating process 56/58 is assumed to have gated measurements for each track, so that the tracks 1 to 4 have possible measurements associated with them given by the table below.

TABLE 1

| Track Number | Gated Measurement Indices |
|---|---|
| 1 | 0, 1, 2, 3 |
| 2 | 0, 2, 3 |
| 3 | 0, 3, 4 |
| 4 | 0, 4 |

Figure 8:
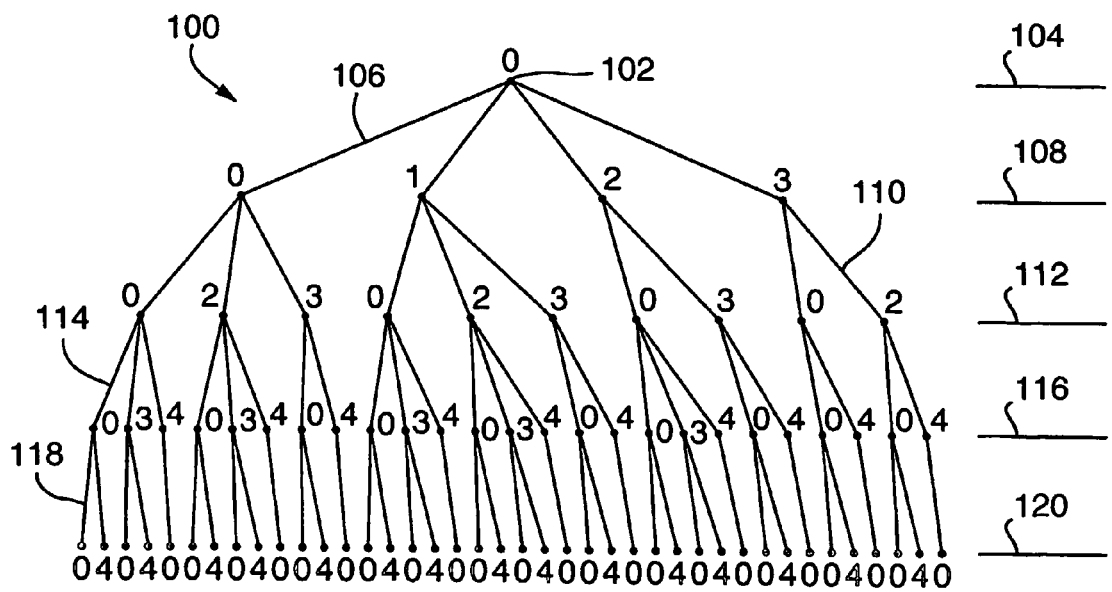
FIG. 8 illustrates combinatorial explosion progressing with number of tracks as a tree structure.

The dummy measurement with index zero is a valid possibility for all tracks and is attributable to all tracks. However it is assumed that real measurements 1 to 4 are only attributable to respective single tracks, in which case once such a measurement has been assigned to one track it cannot be assigned to another (see Equations (4) and (5)). It is convenient to illustrate potential valid track/measurement associations and their diversity as a tree, as shown in FIG. 8 and indicated generally by 100. Here an origin 102 at a first (uppermost) horizontal level 104 represents a start point at which no measurements are as yet associated with tracks. The possibilities that track 1 may be associated with measurement 0, 1, 2 or 3 are represented by lines such as 106 joining the origin 102 to points indexed 0, 1, 2 and 3 respectively all on a second horizontal level 108. The possibilities that track 2 may be associated with measurement 0, 2 or 3 are represented by lines such as 110 joining each second level point to a respective set of points indexed 0, 2 and 3 all on a third horizontal level 112. The possibilities that track 3 may be associated with measurement 0, 3 or 4 are represented by lines such as 114 joining each third level point to a respective set of points indexed 0, 3 and 4 all on a fourth horizontal level 116. The possibilities that track 4 may be associated with measurement 0 or 4 are represented by lines such as 118 joining each fourth level point to a respective set of points indexed 0 and 4 all on a fifth horizontal level 120.

It is now convenient to define additional terminology. A point in the tree 100 with an index 0, 1, 2, 3 or 4 and the origin 102 are referred to as a "node". A "parent" node is defined as a node connected to one or more other nodes on one horizontal level 108, 112, 116 or 120 further down. A child node (plural children nodes) is a node which is connected directly to a parent node, and a (great) grandchild node is (a child node of) a child node of a child node etc. A grandparent node is a parent of a parent node, similarly great grandparent nodes etc. A relationship is defined as a connection such as 110, 114 or 118 between parent and child nodes representing an association of a measurement with the same (descending) track. The tracks are considered in turn and for each track a node created for each combination of nodes for the previous track and measurement that does not cause any measurement to be used more than once.

In the tree 100, the origin or start node 102 is the parent for the first track's four second level child nodes representing possible measurements 0, 1, 2 and 3 being associated with the first track. The first track's four child nodes are also parent nodes for respective second track's third level child nodes, which represent possible measurements for the second track given the parent node's measurement for the first track. When possible measurements for the first track are 0 and 1, all possible measurements 0, 2 and 3 for the second track remain as indicated by there being three child nodes for the two second level nodes on the left hand side of the tree 100. However, when a possible measurement for the first track is 2 or 3, a possible measurement 2 or 3 for the second track is eliminated because it has already been used once. This is indicated by there being only two child nodes for the two second level nodes on the right hand side of the tree 100. When all tracks have been addressed, the nodes at the fifth level 120 represent the set of valid track/measurement associations. The extreme left hand node represents all the tracks being associated with the dummy track, and the extreme right hand node represents tracks 1 to 4 being associated with measurements 3, 2, 4 and 0 respectively.

Figure 9:
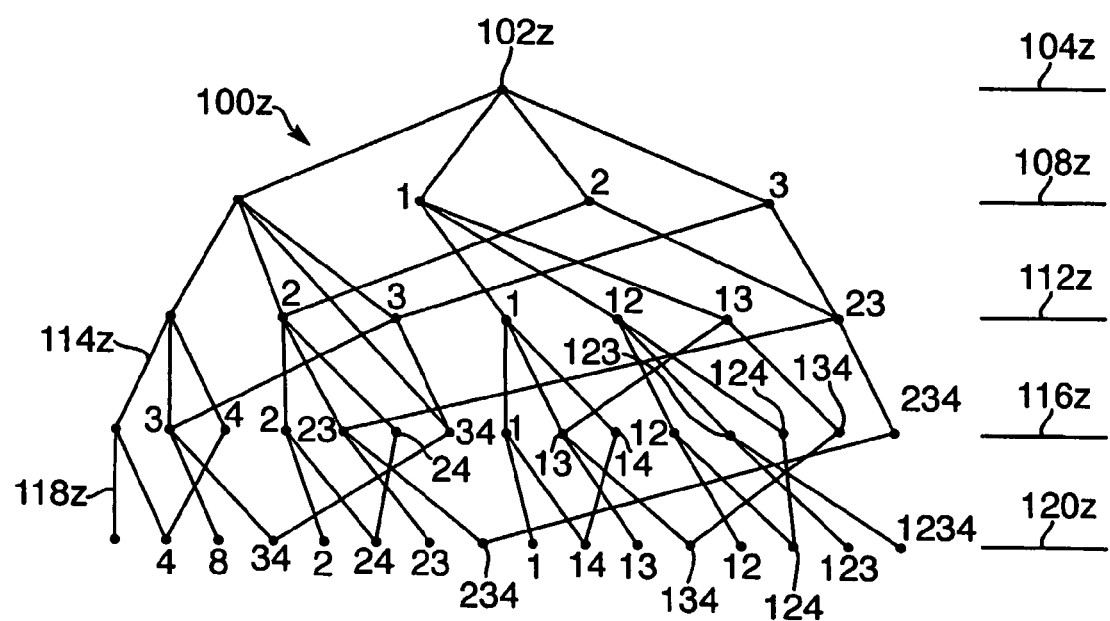
FIG. 9 is equivalent to FIG. 8 with reduction in combinatorial explosion in accordance with the prior art.

The tree 100 illustrates the rapid (exponential) rise in the number of possibilities as tracks increase. The prior art (see Zhou et al. previously mentioned) discloses an approach to reducing the rate of rise in the number of possibilities: this is illustrated schematically in FIG. 9 as a tree 100z and is based on the same track numbers and gated measurement indices as before. In this drawing, parts equivalent to those previously described are like-referenced with the addition of a suffix z. FIG. 9 is equivalent to FIG. 8 with deletion of some links (relationships) between nodes, addition of other links and relabelling of nodes. The following description will address aspects of difference between these drawings only. In FIG. 9, deletion of links appearing in FIG. 8 represents real measurements no longer available due to previous use, and addition of a link represents an equivalent calculation. Links (e.g. 114z, 118z) associated with all 0s have unlabelled nodes to indicate that the associated dummy measurement does not become unavailable after use, unlike real measurements. Other nodes are labelled with one or more indices representing the measurement(s) used up to and including the node in each case and therefore subsequently unavailable to respective children nodes.

In a second level 108z of the tree 100z, there is one dummy measurement node labelled 0 and three nodes labelled 1, 2 and 3 indicating use of measurements indexed 1, 2 and 3 respectively. However, use of measurement 2 in the second level 108z is associated with the same calculation as use of measurement 2 in a third level 112z, and to indicate this the corresponding nodes are joined by a link 123. Similarly, second and third level nodes 3 are associated with the same calculation and are joined by a link 125. Nodes may be labelled with more than one measurement index and be linked to like-indexed nodes, e.g. fourth and fifth level nodes labelled 2, 3 and 4. In the fifth level 120z, an extreme left hand node labelled 0 corresponds to all four tracks being associated with the dummy or 0 measurement, and an extreme left hand node labelled 1, 2, 3 and 4 corresponds to all four tracks being associated with a respective real measurement. Similar remarks apply to other nodes. It will be appreciated that there are nodes with multiple children nodes corresponding to different permutations of tracks using the same combination of measurements.

The prior art described with reference to FIG. 9 exploits the fact that the order in which measurements are used during progress down the tree has no effect on which measurements remain unassigned and therefore available for association with subsequent tracks. The same calculations may therefore be carried out only once by storing a respective set of measurements assigned up to each node in the tree. FIGS. 8 and 9 show that the tree 100z has appreciably fewer nodes and relationships compared to the tree 100, and the tree 100z therefore represents a reduction in computation. However, it can be shown that the tree 100z still grows at a rate which is asymptotically (tends to) exponential in terms of track numbers and corresponding to an undesirably high computational burden for a conventional computer system.

U.S. Pat. No. 5,537,119 exploits an approach related to that described to find a best possible joint event, i.e. a sequence of track/measurement associations as illustrated in FIG. 8 for example. This calculation relates to enumeration of joint events (both sum and maximum) and has some redundancy, so that it is possible to devise methods for finding the best joint event without explicitly enumerating all possible joint events. Exploitation of an explicit realisation of this redundancy is disclosed by Y. Li and A. Hilton, "Towards reliable real-time multiview tracking", Proc of IEEE Workshop on Multi-Object Tracking, July 2001. This realisation is in the context of finding the best joint event, which prohibits nodes in the search tree being explored more than once. As in Zhou et al. previously mentioned, the equivalence is in terms of measurements used.

The computer-implemented track talking stage 14D of the invention will now be described in more detail. In its order tracks stage 80, a pre-processing step available in the literature is implemented to divide tracks into clusters: see J R Werthmann, "Step-by-Step Description of a Computationally Efficient Version of Multiple Hypothesis Tracking", Proc. Signal and Data Processing of Small Targets, pages 288-300, 1992. The clusters are defined such that a cluster's set of measurements has no intersection with other clusters' sets of measurements. Here an intersection of two sets means one or more set members—in this case measurements—which the sets have in common. Each of these sets of measurements is the union of all measurements surviving gating at 56/58 for all tracks within the cluster. The union of multiple sets is defined as a set which contains all members of the multiple sets subject to no member occurring more than once.

Figure 10:
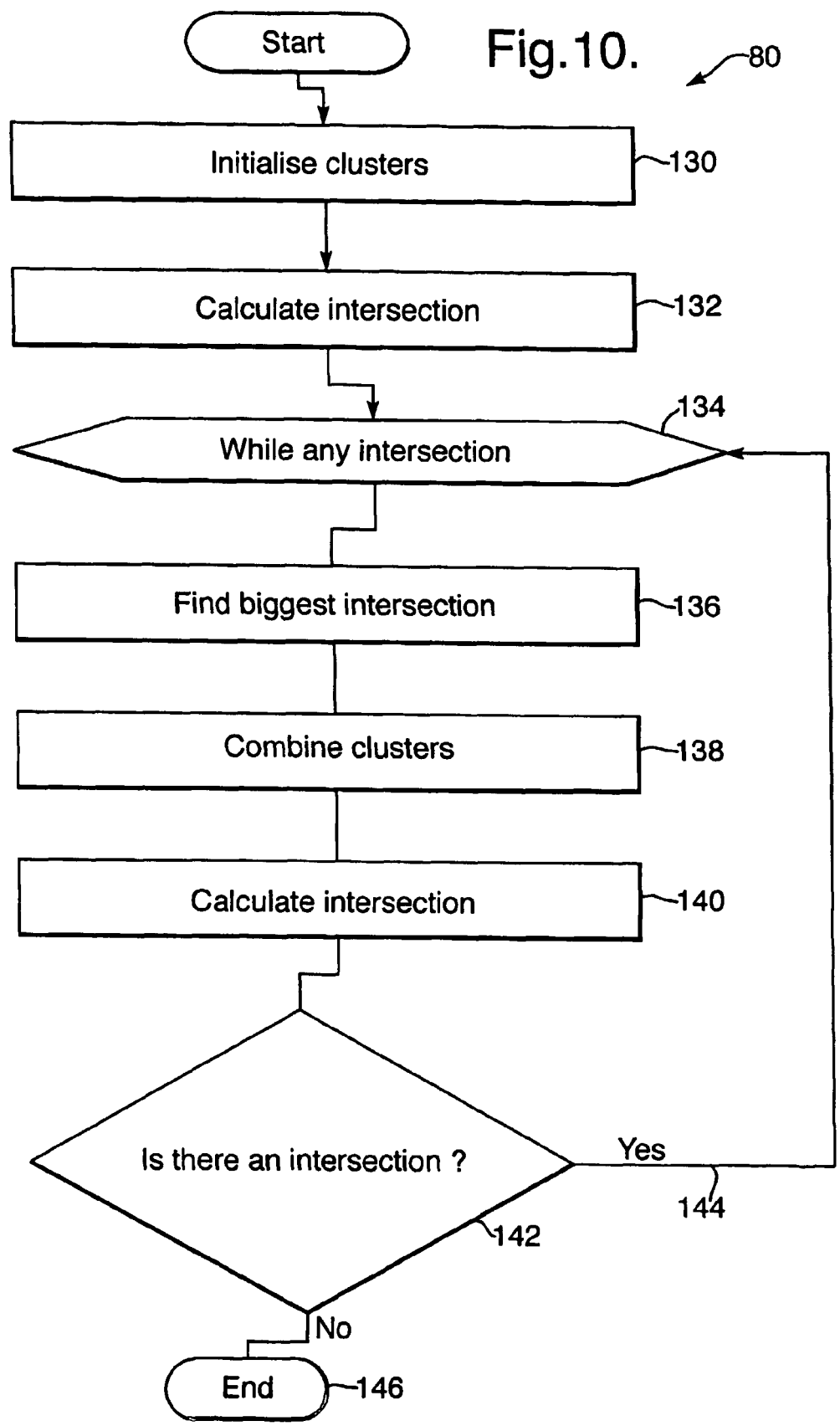
FIG. 10 is a block diagram of a computer-implemented track clustering process for use in the invention.

Referring now to FIG. 10, the clustering process in order tracks stage 80 begins at 130 by defining a set of clusters (lists of tracks and associated gated measurements) as a data file in a computer system (not shown) implementing the process: the set of clusters is empty initially. For the purposes of the following description, a "measurement" is represented by an index 0, 1, 2, 3 or 4 as previously described with reference to FIGS. 8 and 9. For each track in turn, at 132 the computer system finds the intersection between measurements in the track's probabilistic association vector and the measurements in each cluster, dummy measurements being excluded from this. If there are no intersections, which is the case for the first track to be considered as the cluster set is initially empty, the computer system creates a new cluster with the set of gated measurements for the track. If at 134 there are one or more intersections between clusters, then at 136 the pair of clusters with the only intersection (if only one) or biggest intersection (if more than one) is found, and at 138 it is replaced with a single composite cluster with the union of the clusters' tracks and the union of the clusters' measurements and those of the tracks. At 140 the computer system calculates intersections once more, and at 142 it checks to see if any remain. If one or more intersections remain, the computer system iterates steps 134 to 140 via a loop 144. Iteration proceeds until no more intersections remain at 142, whereupon clusters as modified are output at 146. This provides clusters each having tracks and measurements not repeated in another cluster.

TABLE 2

| Track Number | Gated Measurement Indices |
|---|---|
| 4 | 0, 4 |
| 1 | 0, 1, 2, 3 |
| 3 | 0, 3, 4 |
| 2 | 0, 2, 3 |

The next stage is to subject the tracks in each cluster to an ordering process. Table 1 previously given is repeated above as Table 2 for convenience with tracks relocated to require ordering. Table 2 therefore represents a single cluster.

To reduce computational expense, tracks should be ordered to reduce the number of nodes which will be created. The ordering process starts with a cluster, i.e. a set of lists, to be ordered by the computer system, each list (a row in Table 2) consisting of an index identifying the relevant track and that track's gated measurements:

e.g. if track index={set of gated measurements} then track 4={0,4}; track 1={0,1,2,3};
track 3={0,3,4}; and track 2={0,2,3};

The computer system compares the lists with one another in pairs and calculates their intersections (gated measurements common to two lists). The dummy measurement index 0 is ignored in this intersection operation, as it is present in each track's list. The list pair with the greatest number of intersections is then selected; the gated measurements of the pair are combined by appending the first list to the second list and deleting any replications of measurements. This pair is then replaced by their combined list and labelled with the two track number labels concatenated together, e.g. tracks x and y become xy. In other words, the computer system combines two tracks whose set of gated measurement intersections has maximum cardinality and replaces the two lists with the union of the sets. For example, if xy represents the comparison of tracks x={0, a, b, c, d} and y={0, a, b, c} yielding the intersections {a, b, c} then comparing tracks 1 to 4** in pairs:

12={2, 3}; 13={3}; 14=Ø; 23={3}; 24=ø; 34={4}, where Ø denotes the empty set, i.e. a list containing zero elements.

The cardinality of the list |12|=2 and is the maximum, because other lists |13| etc. all contain less than two elements. The amended list of tracks becomes: 12={0,1,2, 3}; 3={0,3,4}; 4={0,4}.

The next step is to compare the track pairing 12 with tracks 3 and 4 individually and tracks 3 and 4 with one another:

i.e. 123={3}; 124=Ø; 3**4={4}        (39)

This gives a further amended list: 12={0,1,2,3}; 34={0, 4}. The final pairwise comparison of 12 and 34 results in ordering of the tracks as a sequence 1234, as can be verified to be correct from Table 1.

The make net stage 82 of the invention follows the order tracks stage 80. It is different to the prior art because it does not label nodes with measurement indices to which they relate. Instead it labels nodes with what is referred to as an "identity", which will be defined later. This enables a considerable reduction in processing burden in the computer system, as will become clear. To reflect the fact that the invention does not produce a prior art tree 100/100z, what is produced is referred to as a net. It takes as input an ordered list of tracks in a cluster and outputs for the cluster a net representation of possible track/measurement associations of the kind described earlier. In accordance with this invention, the nodes for the ith track represent valid track/measurement associations possible for this track, and, in addition, for all subsequently processed tracks, not merely associations of the j tracks/measurements considered up to and including the jth track. The resulting net can be thought of as describing possible routes down the tree in FIG. 8.

Figure 11:
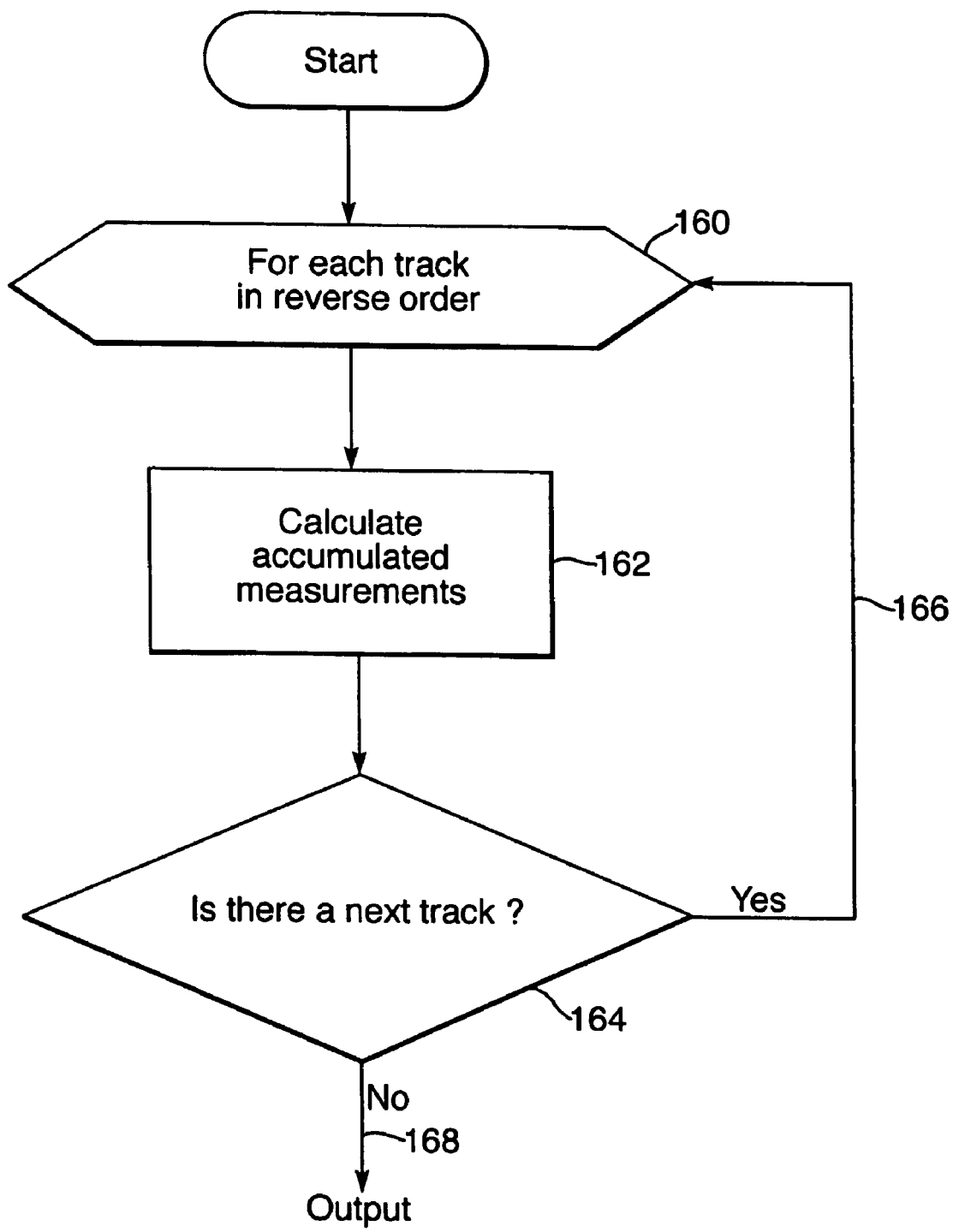
FIG. 11 is a block diagram of a computer-implemented measurement accumulation process for use in the invention.

Referring to FIG. 11, the make net stage 82 has a preprocessing stage in which a set of accumulated measurements is created for each track. This stage is begun at 160 by the computer system iterating in reverse order through the list of tracks received from the order tracks stage 80. Here reverse order means iterating through the ordering deduced at 80, starting with the last track in this ordering and ending with the first such track, i.e. track 4 in Table 1, and continuing with tracks 3, 2 and 1 in succession. This creates a set of accumulated measurements for each track at 162, the set being a list of the union of measurements for use in processing remaining tracks. At each stage of the iteration, a respective current track is considered: the current track has accumulated measurements which are defined as the union of accumulated measurements for a track processed in an iteration (if any) immediately preceding the current iteration and gated measurements for that track. In other words, the gated measurements of a track (if any) processed immediately before the current track are added to those of any earlier processed tracks with replications of measurements omitted. In implementing the union operation of accumulated and gated measurements, the dummy measurement index 0 is omitted by the computer system. Denoting accumulated measurements for track x as acc(x) and Ø as the empty set, then for track 4, since there is no track processed in an immediately preceding iteration, acc(4) is calculated at 162 as:

$$acc(4)=\emptyset \qquad (40)$$

At 164 the computer system checks whether or not any track remains (yes in this case), and if so it iterates via a loop 166 back to 160 for processing of track 3. For track 3, there are now both accumulated measurements (acc(4)) for a track (track 4) processed in an immediately preceding iteration and corresponding gated measurements {0,4} for the latter track. Denoting the union operation by "++" and dropping the dummy measurement 0, accumulated measurements acc(3) for track 3 are calculated at 162 as:

$$acc(3)=acc(4)++\{0,4\}=\{4\}; \qquad (41)$$

Similarly, iteration round the loop 160 to 164 continues for tracks 2 and 1 to produce:

$$acc(2)=acc(3)++\{0,3,4\}=\{3,4\}; \qquad (42)$$

$$acc(1)=acc(2)++\{0,2,3\}=\{2,3,4\}. \qquad (43)$$

The accumulated measurements acc(4) etc. are then output from the illustrated procedure at 168. The accumulated measurements for a track represent the combined measurements (deleting replications) within the gates of subsequent tracks which are as yet unprocessed in the process of building a net, as will now be described.

Figure 12:
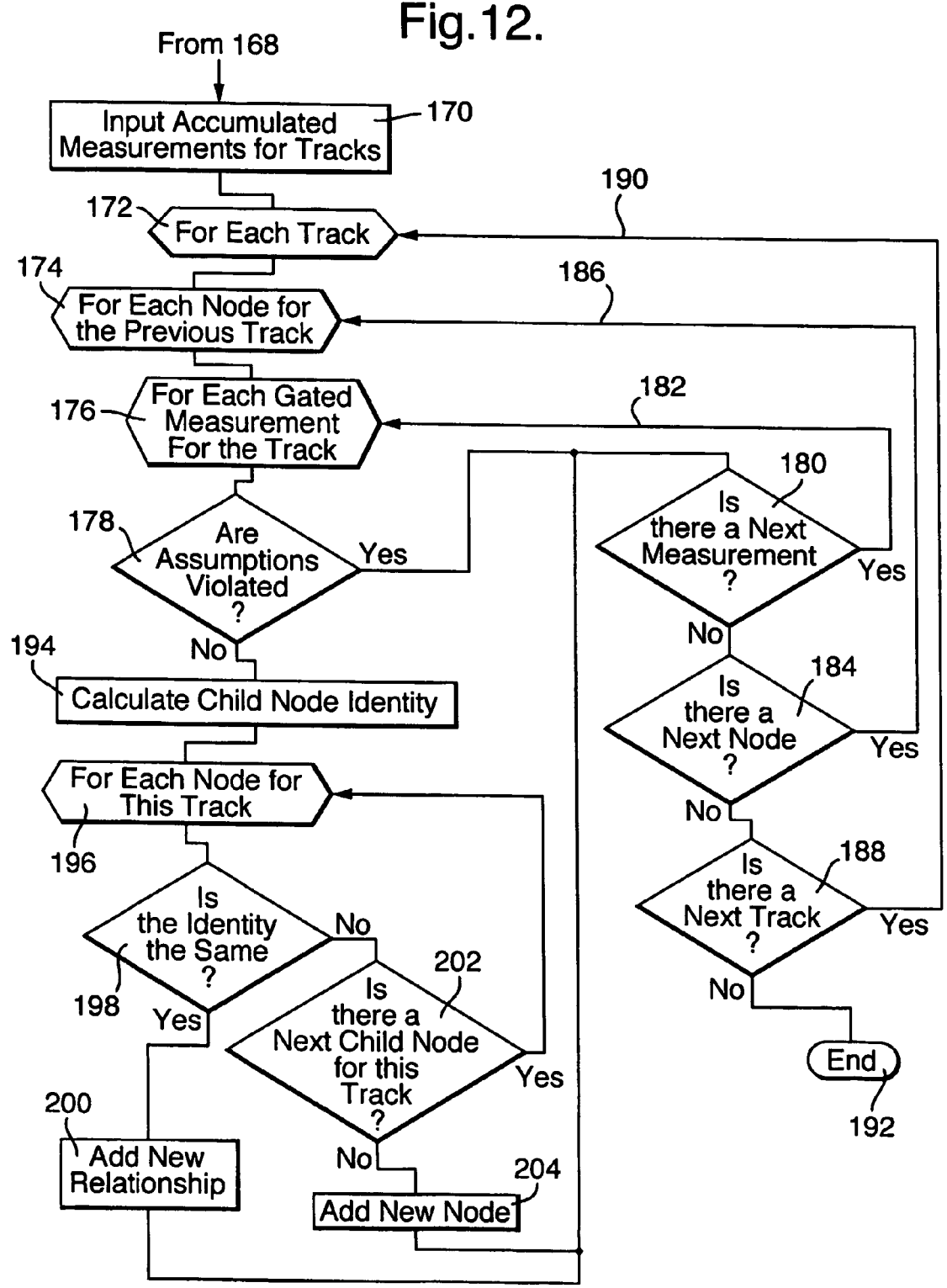
FIG. 12 is a flow diagram of computer system operation for a child node identity calculation process of the invention.

Referring now to FIG. 12, there is shown a flow diagram of computer system operation for building a net in a second part of step 82. The accumulated measurements acc(1) etc. are input at 170 from 168 (not shown), and arranged for processing in forward order, i.e. iterating through the deduced ordering, starting with the first ordered track and ending with the last ordered track. In this example the order is track 1, 2, 3, 4 as in Table 1.

At 172, track 1 is initially selected for a first iteration: At 174 the computer system checks whether or not a track ("previous track") has already been processed, which is not the case for track 1. At 176 a first gated measurement is selected for track 1, and a check is made at 178 to see if assigning this measurement to the first track would violate any of the assumptions (one track per measurement and one measurement per track). Since no measurement assignments have been made, the assumptions are not violated and at 180 the computer system checks whether or not there is a next measurement. If so, iteration of measurements for the relevant track proceeds via a loop 182 back to 176. If not, at 184 the computer system checks whether or not there is a next node for the previous track. If there is a next node, iteration of previous track nodes for the relevant track proceeds via a loop 186 back to 174. If not, at 184 there is a check for a next track remaining to be processed. If there is a next track, iteration for this proceeds via a loop 190 back to 172. If not, iteration ends at 192.

At 178 the computer system checks whether or not assumptions have been violated. It is done by not considering any measurement indices for the current track that are within the parent node's identity. The make net process 82 proceeds at 194 with the computer system calculating a child node identity. In this connection, by analogy with the trees 100/100z, for a child node the net has one or more parent nodes created in the immediately preceding iteration (if any) for a track higher than the current track in Table 1 or a start node (if no preceding iteration). At each iteration, a respective new child node is proposed for each gated measurement of the current track indicated by a respective index and element in the track's probabilistic association vector. Each child node is given a respective identity. The identity is an indication of how measurement assignments made for tracks already considered affect assignments for tracks remaining to be considered. For a current track, the accumulated measurements then represent those measurement assignments for remaining (i.e. as yet unprocessed) tracks that can be affected by a measurement assignment for the tracks up to and including the current track.

At 194, a new child node is proposed for the first track. For this node, a child node identity is obtained by combining the measurement index associated with the child (that of the relevant gated measurement) with the identity of its parent, deleting any replication, then comparing this combination with the indices of the current track's accumulated measurements and selecting those indices common to both. In mathematical terms, the child node identity is calculated as the intersection of the current track's accumulated measurements with the union of the identity of the parent node under consideration and the measurement index to be implemented by the child node in this iteration. The symbols "∩" for the set intersection operation and "U" for the set union operation will be employed in expressions used to build a net. For a current track $T_j$ with a kth measurement index $m_k$ in a set of K measurement indices $\{m_1$ to $m_K\}$, accumulated measurements acc(j) and an identity $l_P$ of a parent node under consideration, an identity $I_{Ch}$ of a child of that parent is given by:

$$l_{Ch=acc}(j) \cap (l_P U m_k) \quad (44)$$

The parent node identity $l_P$ expresses the effect on measurement choices for the child node of any and all measurements employed in generating the parent. Its union with a measurement (index $m_k$) expresses the extension of a relationship (expressed as the measurement index) from the parent to the child node. Finally, the intersection of the parent/measurement union with the accumulated measurements expresses one or more measurements among those previously available but becoming unavailable by virtue of the current measurement assignment $m_k$ at the current child node.

Because child nodes become parent nodes later, the effect of the union $l_P U m_k$ in Equation (44) is cumulative down the net. Consequently, the proliferation of nodes which occurs in the prior art (see e.g. level 120 in FIG. 8) is reduced. Equation (44) expresses an identity as one or more measurements that have been assigned to tracks and are therefore unavailable for use by its children, grandchildren etc. nodes. Other identities can be used with equivalent effect on reduction of processing burden, e.g. the identity may indicate one or more measurements that have not been assigned to tracks and therefore remain available for use.

In this, and subsequent operations in make net 82, the dummy measurement index 0 is included in both the union and intersection operations—these being standard mathematical set operations. The union and intersection operations previously defined, i.e. ++ and  respectively, could also be used, because the accumulated measurements do not include the dummy 0** measurement index in this case.

Before a proposed child node is actually created by adding it as a new node to the evolving net, at 198 the computer system checks whether or not it has the same identity as a first child node already created for the first track. If such a child node has in fact already been created, then instead of creating another, the proposed child node is represented at 200 by an additional relationship linking the parent node and the existing child node to add to the or each such relationship established earlier. This greatly simplifies the net structure. The relationship is labelled with the measurement index associated with the proposed child node, this label being in addition to labels acquired earlier. Links between nodes may therefore acquire multiple relationships indicated by respective measurement indices, and the relationships for each track are stored together. Unlike the prior art, nodes are no longer labelled with measurement indices but instead with identities, and measurement indices are instead ascribed to relationships or links between nodes.

The proposed child node is now discarded if a first earlier child node exists with the same identity. If the proposed child node and first earlier child node do not have the same identity, then at 202 the computer system enters a loop to check whether or not there is another earlier child node for the first track for identity comparison with the proposed child node. If there is no other earlier child node, then at 204 the proposed child is created as a new child node with a relationship to its parent labelled with the measurement index associated with the child node. If there is another earlier child node, the computer system iterates 196/198/200 or 196/198/202 once more until the proposed child node becomes represented by a new relationship or a new node.

When a new relationship or node is created at 200 or 204, at 180 the computer system checks for a next measurement for track 1, which has four measurements in its gate. In the make net stage 82, the computer system therefore cycles four times round the loop 176, 178, 194 to 200 or 204, 180, 182 for track 1 until no track 1 gated measurements remain unconsidered. After this, the computer system receives a no next measurement at 180, and at 184 checks for a next node of the previous track. There is no previous track for track 1, so there is no next node. Processing therefore moves to 188, where it is confirmed that a next track (track 2) is available, and a signal passes via the link 190 to 172 input track 2. Track 2 is dealt with in the same way as track 1, the only difference is that track 1 now constitutes a "previous track". Track 1 has four gated measurements, 0, 1, 2 and 3, but other tracks don't have gated measurement 1, which is therefore equivalent to 0 as far as they are concerned. For track 1 therefore gated measurements 0 and 1 are treated as two associations for a single node, and gated measurements 0 to 3 give rise to three nodes not four. Consequently there are three iterations via 174 for track 2. Similarly, there will be two iterations via 174 for track 3 and two iterations via 174 for track 4. After track 4 has been considered, the net has been built as a set of nodes labelled with identities and linked by one or more relationships in each case, and iterations end at 192.

To summarise, the invention introduces the novel approach that a new node for the jth track (of which there are $N_T$) is not created if an existing node for the jth track can result in the same set of valid track/measurement associations possible for the $N_T$-j remaining tracks. If such a node exists already, then it is added to the list of children nodes of the parent node and the parent added to a list of the child node's parents which is stored. The track/measurement association is then used to label the parent-child relationship to which it gave rise; hence there can be multiple connections (relationships) between the same pair of parent and child nodes as a result of different measurement choices that give rise to the same set of valid possible track/measurement associations for the remaining tracks. The result is a net of interconnected nodes labelled with intersections as defined above connected by links each labelled with one or more relationships.

FIGS. 13A to 13E show successive stages in the construction of a net 100*i* in accordance with the invention for tracks and associated measurement indices shown in Table 1, i.e.:

$T1: \{0\ 1\ 2\ 3\}$; $T2: \{0\ 2\ 3\}$; $T3: \{0\ 3\ 4\}$; and
$T4: \{0\ 4\}$

Figure 13A:
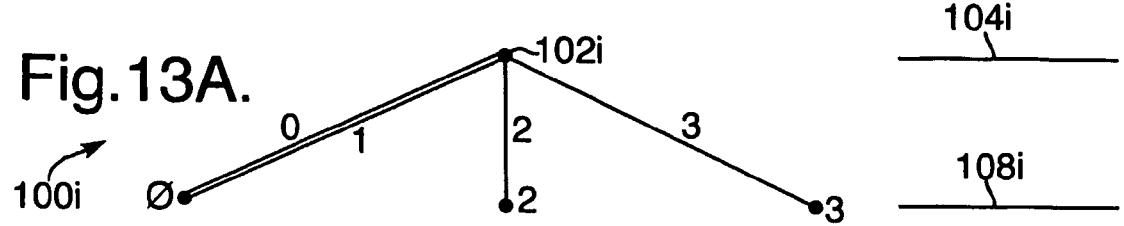
FIGS. 13A to 13E illustrate building of a net using the FIG. 12 process.

In FIGS. 13A to 13E, parts corresponding to those described earlier are like referenced with suffix z replaced by i. Repeating the results of Equations (40) to (43) for convenience, i.e. accumulated measurements for track x being denoted as acc(x):

$acc(1)=\{2,3,4\}$; $acc(2)=\{3,4\}$; $acc(3)=\{4\}$; and
$acc(4) = \emptyset$;

Repeating Equation (44) here for convenience, for a current track $T_j$ with a kth measurement index $m_k$ in a set of K measurement indices $\{m_1$ to $m_K\}$, accumulated measurements acc(j) and an identity $l_P$ of a parent node under consideration, an identity $l_{Ch}$ of a child of that parent is given by:

$$l_{Ch}=acc(j) \cap (l_P U m_k) \quad (44)$$

where ∩ and U are the set intersection and union operations. FIG. 13A shows a first stage of building the net 100*i*, and relates to building child nodes for track 1 at a second level 108*i* beginning with a start node 102*i* at a first level 104*i*. For track 1, acc(1)={2,3,4}, the parent node is the start node 102*i* with $l_P=\emptyset$, and there are four (K=4) measurement indices $m_k$, 0, 1, 2 and 3.

The identities of children nodes for track 1 with start node 102*i* as parent are given by evaluating Equation (44) for respective measurement indices 0, 1, 2 and 3 in turn. This is set out in Table 3 below, where "Expression" means the right hand side of Equation (44) with parameters inserted.

TABLE 3 track 1

| Measurement Index $m_k$ | Parent Identity | Expression | Child Node $I_{Ch}$ |
|---|---|---|---|
| 0 | ∅ | {2, 3, 4} ∩ (∅U0) | ∅ |
| 1 | ∅ | {2, 3, 4} ∩ (∅U1) | ∅ |
| 2 | ∅ | {2, 3, 4} ∩ (∅U2) | 2 |
| 3 | ∅ | {2, 3, 4} ∩ (∅U3) | 3 |

From Table 3, evaluating the Expression for each measurement index results in child node identifies ∅ twice, 2 and 3, i.e. three different identities one of which is repeated. In FIG. 13A, from parent node 102*i*, new child nodes with identities 0, 2 and 3 are created for measurement indices 0, 2 and 3 of track 1 at second level 108*i*: these nodes are shown linked to the parent or start node 102*i* with relationships shown as lines labelled with the respective measurement indices 0, 2 and 3 giving rise to them. It is now recalled that a child node is not created if there already exists a child node for the same track with the same identity, but instead a relationship is added. Consequently, a proposed child node which would have corresponded to measurement index 1 is omitted, and instead a second relationship (shown as a second line) labelled with this index is added to the link to node ∅.

As has been said, other forms of identity can be used with equivalent effect. E.g. an identify indicating measurements that have not been assigned would give child node 3 in Table 3 an identity (2,4), which also illustrates the fact that an identity may comprise more than one measurement index.

Figure 13B:
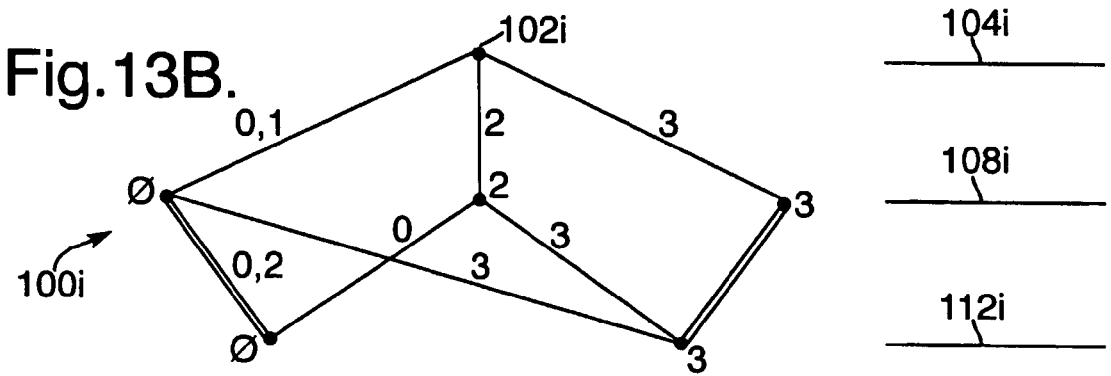

FIG. 13B shows a second stage of building the net 100*i*, and relates to building new child nodes for track 2 at a third level 112*i*. To simplify illustration, only single lines are shown for relationships of the preceding stage to level 108*i*, and multiple relationships to a node are now indicated for the first stage by multiple relationship indices 0,1. For track 2, acc(2)={3,4}, parent nodes are first level nodes with $l_P\emptyset$ and 3, and there are three (K=3) measurement indices $m_k$, 0, 2 and 3. The identities of children nodes for track 2 are given by evaluating Equation (44) for each combination of measurement index 0, 2 and 3 and parent $l_P=\emptyset$, 2 and 3 provided that the use of measurement assumptions are not violated, as set out in Table 4 below.

TABLE 4 track 2

| Measurement Index $m_k$ | Parent Identity | Expression | Child Node $I_{Ch}$ |
|---|---|---|---|
| 0 | ∅ | {3, 4} ∩ (∅U0) | ∅ |
| 2 | ∅ | {3, 4} ∩ (∅U2) | ∅ |
| 3 | ∅ | {3, 4} ∩ (∅U3) | 3 |
| 0 | 2 | {3, 4} ∩ (2U0) | ∅ |
| 2 | 2 | {3, 4} ∩ (2U2) | ∅ |
| 3 | 2 | {3, 4} ∩ (2U3) | 3 |
| 0 | 3 | {3, 4} ∩ (3U0) | 3 |
| 2 | 3 | {3, 4} ∩ (3U2) | 3 |

From Table 4 evaluating the Expression for each measurement index and each parent identity (leaving assumptions inviolate) results in child node identities ∅ four times and 3 four times, i.e. two different identities both of which are repeated. By analogy with earlier description, new child nodes with identities ∅ and 3 are created at the third level 112*i*. Of these, child node identity ∅ has two relationships with second level parent node Ø and two further relationships with second level parent node 2, for measurement indices 0 and 2 in both cases. This is represented by pairs of lines linking parent and child nodes in the second and third levels respectively. Third level child node identity 3 has one relationship with second level parent node Ø (measurement index 3), one with second level parent node 2 (measurement index 3), and two with second level parent node 3 (measurement indices 0 and 2). These are represented by two single lines linking parent and child nodes in the second and third levels 108$i$ and 112$i$ respectively.

Figure 13C:
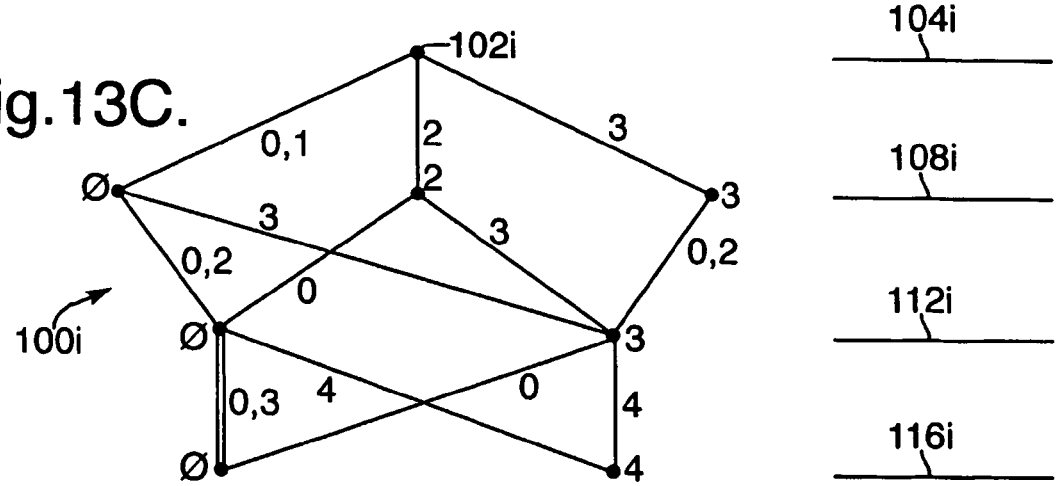

FIG. 13C shows a third stage of building the net 100$i$ with new child nodes at a fourth level 116$i$ track 3. Single lines are shown for relationships of preceding stages to level 112$i$ multiple relationships by indices. For track 3, acc(3)={4}, parent nodes are third level nodes with $l_P$=Ø and 3, and there are three (K=3) measurement indices $m_k$, 0, 3 and 4. The identities of children nodes for track 3 for combinations of measurement indices and parent identities are set out in Table 5 below.

TABLE 5 track 3

| Measurement Index $m_k$ | Parent Identity | Expression | Child Node Identity $I_{Ch}$ |
|---|---|---|---|
| 0 | Ø | {4} ∩ (ØU0) | Ø |
| 3 | Ø | {4} ∩ (ØU3) | Ø |
| 4 | Ø | {4} ∩ (ØU4) | 4 |
| 0 | 3 | {4} ∩ (3U0) | Ø |
| 4 | 3 | {4} ∩ (3U4) | 4 |

From Table 5, evaluating the Expression for each measurement index and each parent identity results in child node identities Ø three times and 4 twice, i.e. two different identities both of which are repeated. New child nodes with identities Ø and 4 are therefore created at a fourth level 116$i$. Of these, child node identity Ø has two relationships with third level parent node Ø and a single relationship with third level parent node 3: these relationships are indicated by pairs of parent-child connecting lines labelled with measurement indices 0 and 3 for the parent identity Ø, and a single line for the relationship constructed from the parent identity 3. Fourth level child node identity 4 has one relationship with second level parent node Ø, and one with second level parent node 3, both relationships being measurement index 4.

Figure 13D:
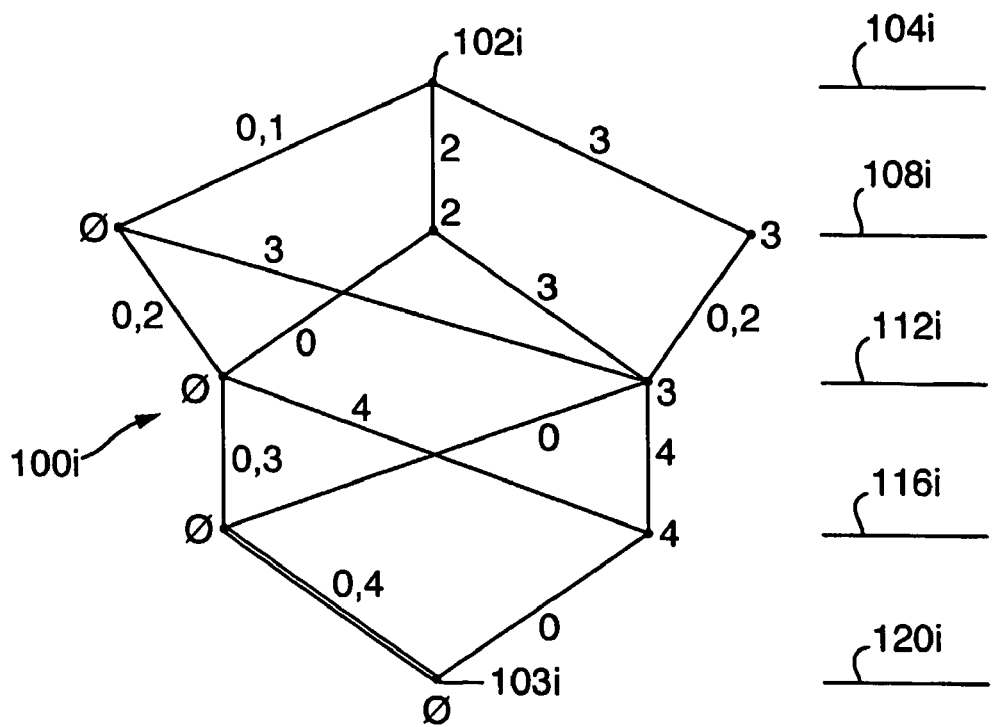

FIG. 13D and Table 6 constitute the track 4 equivalent of the like for earlier tracks, and will not be described in detail. Track 4 results in a single node with identity Ø in a fifth level 120$i$: this has a pair of relationships with fourth level parent node Ø and a single relationship with fourth level parent node 4: these relationships are labelled with measurement indices 0 and 4, and 0, respectively.

TABLE 6 track 4

| Measurement Index $m_k$ | Parent Identity | Expression | Child Node Identity $I_{Ch}$ |
|---|---|---|---|
| 0 | Ø | Ø ∩ (ØU0) | Ø |
| 4 | Ø | Ø ∩ (ØU4) | Ø |
| 0 | 4 | Ø ∩ (4U0) | Ø |

Figure 13E:
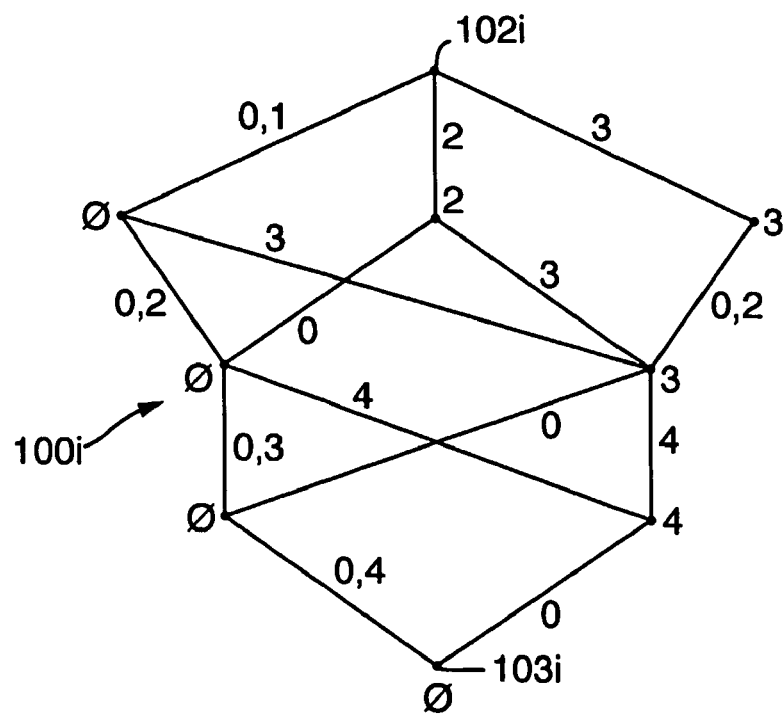

The completed net 100$i$ is shown in FIG. 13E: here all relationships are indicated by single lines with one or more associated measurement indices. The advantage provided by the invention can be seen by comparing FIG. 13E with the prior art of FIG. 9, from which the reduction in signal processing burden is evident from the simpler structure of FIG. 13E. In fact it can be shown that the rate of rise of signal processing burden in the computer system with increase in number of tracks is much lower for the invention compared to the prior art.

As shown in FIG. 13E, each node is associated with one or more relationships, and each node therefore represents a set of valid track/measurement associations. Each relationship represents a single valid track/measurement association. The net 100$i$ terminates in a single node 103$i$ with identity Ø. Although a node in the net 100$i$ sometimes represents several nodes of the exhaustive tree 100 with common node structure underneath, the probability calculations for the nodes with common substructure is also the same: this enables repetition of probability calculation to be avoided and reduction in processing burden in accordance with the invention.

It should be emphasised that the net 100$i$ (and also each of the trees 100 and 100$z$) is a convenient conceptualisation in diagrammatic form. It is not necessary to draw such a net in practice. In processing in accordance with the invention, as illustrated in FIG. 1($a$), the computer system is used to automate generation of node identities and internode parent-child relationships for tracks as illustrated in the net 100$i$. In "building the net" what the computer system actually does is store track numbers, associated node identities and inter-node relationships (measurement indices) for subsequent use in generating updated probabilistic association vectors as will be described later.

The advantage provided by the invention arises out of its avoidance of proliferation of child nodes with the same identity for the same track: this identity allows the determination of nodes (for a given track) that have common sub-structure in the exhaustive tree of FIG. 8. If parent nodes with the same identity are expanded out into child nodes, the same node sub-structure results in each case. See e.g. in FIG. 8 the two first level nodes 108 indexed 0 and 1 which both have identical child, grandchild, and great-grandchild nodes. Instead of expanding out these same node structures more than once, in accordance with this example of the invention the common node structure they share is created once only and its replication is represented by recordal of repetitions ("relationships") instead of addition to a tree.

The forwards pass stage 84 follows the make net stage 82. It is a modification of a forward pass component of a known forward—backward hidden Markov model algorithm to enable it to cater for a varying number of nodes for each track. See L R Rabiner and B H Juang, "An Introduction to Hidden Markov Models", IEEE Acoustics, Speech and Signal Processing Magazine, pages 4-16, January 1986. Starting with a first track, the tracks are processed in turn.

Each relationship extending from a parent node number $n'_{j-1}$ (for the j−1th processed track or jth net level) down the net 100$i$ to a child node number $n_j$ (for the jth processed track) has a forward weight $p_F(n_j)$. The forward weight $P_F(n_j)$ is calculated by the computer system by multiplying a weight $p(W_{jR(n'_{j-1},n_j)})$ of the track/measurement association which the relationship indicates by a forward weight $p_F(n'_{j-1})$ for a parent of the node. A child node may have multiple parents, grandparents etc., and the same parent node can occur more than once in a child node's list $P(n_j)$ of parents etc., in which case $p_F(n'_{j-1}) p(\omega_{jR(n'_{j-1},n_j)})$ for $(n'_{j-1})$ would be summed for each of these occurrences. For each track and for each child node, the node forward weight $p_F(n_j)$ is produced by the computer system by summing over all relationships extending down the net 100i to the relevant child node in each case: i.e.:

$$p_F(n_j) = \sum_{n'_{j-1} \in P(n_j)} p_F(n'_{j-1}) p\left(\omega_{jR(n'_{j-1}, n_j)}\right) \qquad (45)$$

where $n'_{j-1} \in P(n_j)$ indicates the summation is over only those values of $n'_{j-1}$ which are in a child node's list $P(n_j)$ of parents, and $p(\omega_{jR(n'_{j-1}, n_j)})$ is a weight reflecting the probability that track j has a relationship $R(n'_{j-1}, n_j)$ (a measurement index with a weight from the probabilistic association vector prior to modification) between the relevant child node number $n_j$ and its $n'_{j-1}$ th parent node.

Figure 14:
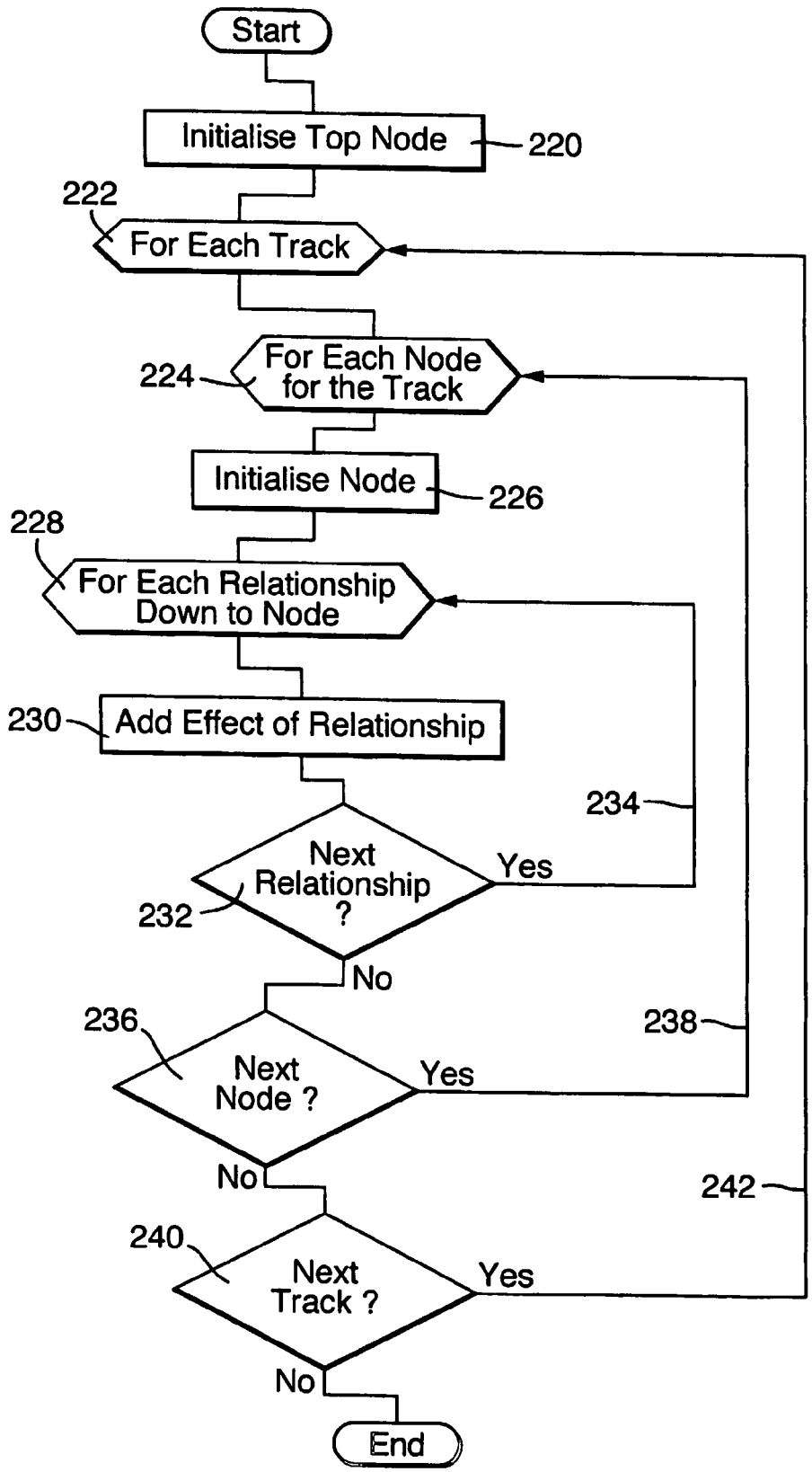
FIG. 14 is a flow diagram of computer system operation for calculation of forward weights for updating probabilistic association vectors; computer-implemented of computer system operation

Referring now to FIG. 14, there is shown a flow diagram of computer system operation for the forwards pass stage 84. Beginning at a top or start first level node 102i this node is initialised at 220 by assigning it a forward weight of unity. A first loop is then entered at 222 in which tracks are selected iteratively. Track 1 is selected on a first iteration, and then a second loop is entered at 224 in which in the nodes of track 1 (i.e. in the second level 108i) are selected iteratively. At 226 a current node under consideration is initialised by setting its node forward weight $p_F(n_j)$ to zero. This forward weight is then calculated as the parent's forward weight multiplied by the probability of the respective relationship giving rise to the node, or if the node has two or more such relationships by the sum of the relationships' probabilities. A third loop beginning at 228 is entered in which in relationships between the top node 102i and the track 1 node being considered are selected iteratively if more than one and solely if not.

The effect of a first relationship is calculated at 230 as one of the products being summed on the right hand side of Equation (43), and it becomes the first term in the summation. At 232 iteration of the third loop begins for the second relationship down to the node (if it has one) via a link 234. The third loop 228 to 234 iterates until forward weights for all relationships (two in this case) down to the first node (Ø) of the first track (track 1) have been evaluated and summed using Equation (43) to produce a first node forward weight of the kind $p_F(n_j)$, which is a general expression for the forward weight to the $n_j$ th node of the jth track.

At 236 the second node of the first track is selected and via a link 238 the second loop 224 to 238 iterates over second node relationships (only one in this case) to produce another node forward weight. This loop is iterated until all first track nodes have been considered, at which point the process 84 moves to a step 240 with a link to the track select step 222 in the first loop 222 to 242 and the second track is selected. The first loop 222 to 242 iterates over each of the subsequent tracks 2 to 4 in turn to produce respective node forward weights for each node in the net 100i other than the start node 102i.

The backwards pass stage 86 follows the forwards pass stage 84, and is similar, except that weights are calculated up the net 100i instead of down it. It is a modification of a backwards pass component of the forward—backward hidden Markov model algorithm of Rabiner et al. (see above) to enable it to cater for a varying number of nodes per track. Each relationship extending from a "child-of-child" node number $n'_{j+1}$ (for the j+1th track or j+2th net level) up the net 100i to a child node number $n_j$ (for the jth track) has a backward weight. The backward weight of a relationship is calculated by multiplying the weight $p(\omega_{(j+1)R(n_j, n'_{j+1})})$ of the track/measurement association (which the relationship $R(n_j, n'_{j+1})$ indicates) by a backward weight $p_B(n'_{j+1})$ of a relationship between a child-of-child node and a grandchild-of-child node of the child node in each case. For each track and for each child node, the backward weight up to the child node is summed over all relationships up to it, i.e.:

$$p_B(n_j) = \sum_{n'_{j+1} \in C(n_j)} p\left(\omega_{(j+1)R(n_j, n'_{j+1})}\right) p_B(n'_{j+1}) \qquad (46)$$

where $n'_{j-1} \in C(n_j)$ indicates the summation is over only those values of $n'_{j-1}$ appearing in a child node's list $C(n_j)$ of children, in which here again an individual node can appear more than once.

Figure 15:
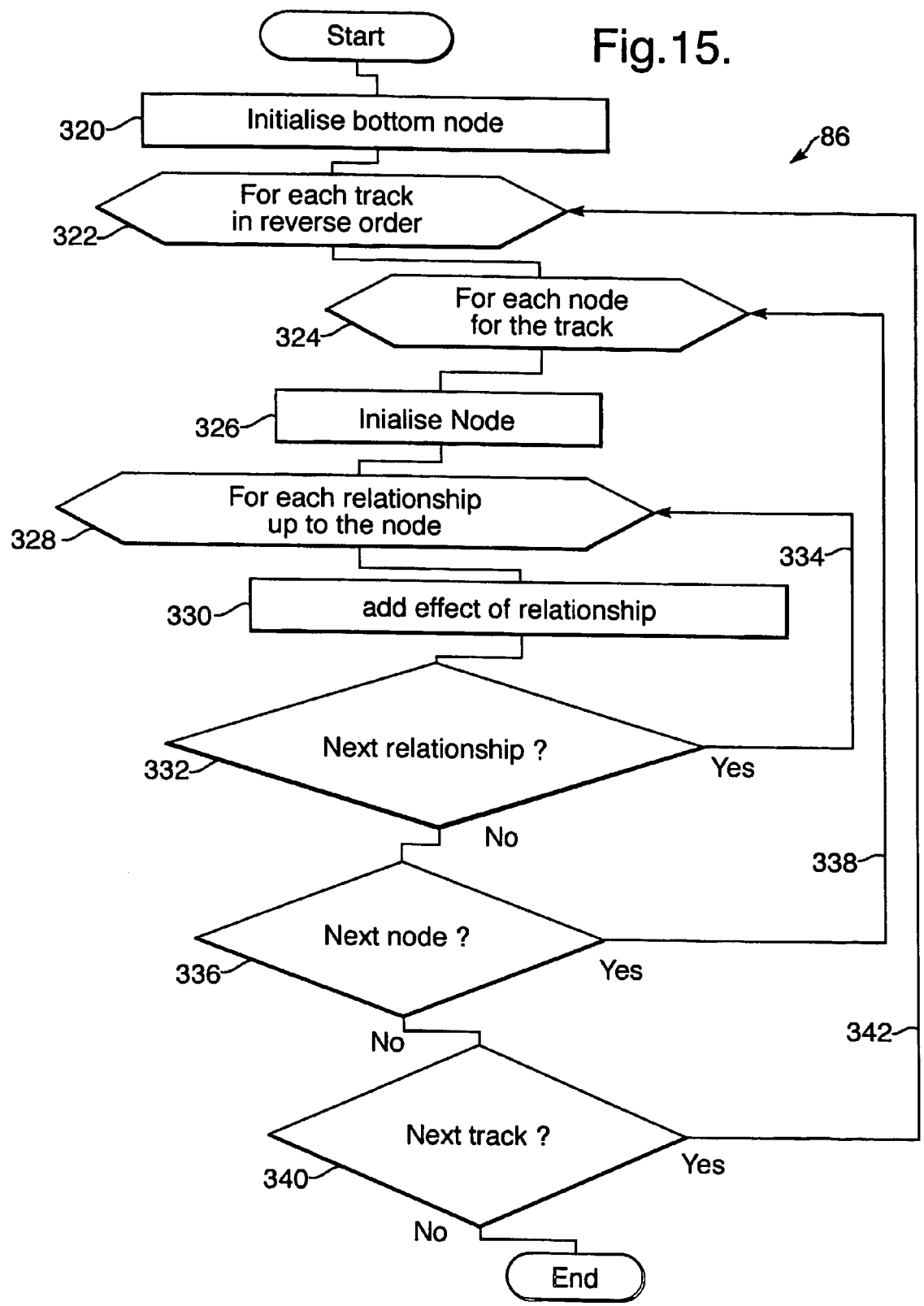
FIG. 15 is a flow diagram of computer system operation for calculation of backward weights for updating probabilistic association vectors.

Referring now to FIG. 15, there is shown a flow diagram of computer system operation for the backwards pass stage 86. It is very similar to the flow diagram for the forwards pass stage 84, but it is calculated up the net 100i and initialisation is somewhat different. Beginning at a lowermost node 103i (see FIG. 13E), a backward weight is initialised by setting it to unity. A backward weight for a node is defined as a sum of weights of relationships going upwards to the node each multiplied by an associated child node backward weight. A first loop is then entered at 322 in which tracks are selected iteratively in reverse order. Here reverse order means iterating through the ordering deduced at 80, starting with the last ordered track and ending with the first ordered track, i.e. track 4 in Table 1, and continuing with tracks 3, 2 and 1 in succession. However, the bottom node 102i is associated with track 4, and its initialisation to unity means that track 4 need not be considered further. Track 3 is therefore selected on a first iteration, and then a second loop is entered at 324 in which in the nodes of track 3 (i.e. in the fourth level 116i) are selected iteratively. At 326 a current node under consideration is initialised by setting its node backward weight $p_B(n_j)$ to zero.

A third loop is entered at 328 in which relationships between the bottom node 103i and a first track 3 node being addressed are selected iteratively. The effect of a first relationship is calculated at 330 as one of the products being summed on the right hand side of Equation (43), and it is added to an accumulating sum which was initially zero prior to iteration beginning. At 332 iteration of the third loop begins via a link 334 for the second relationship up to the first track 3 node. The third loop 328 to 334 iterates until backward weights for all relationships (two in this case) from bottom node 103i up to the first node (Ø) of track 3 have been evaluated and summed using Equation (43). This produces a track 3 first node backward weight of the form $p_B(n_j)$, which is a general expression for the backward weight to the $n_j$th node of the jth track.

At 336 the second node (4) of track 3 is selected, and via a link 338 the second loop 324 to 338 iterates over a second node relationship (Ø) to produce another node backward weight. This loop has now iterated over all (both) available track 3 nodes, at which point the process 86 moves to a step 340 with a link to the track select step 322 in the first loop 322 to 342 and the second track is selected. Similarly, the first loop 322 to 342 iterates over each of the subsequent tracks 3, 2 and 1 in succession to produce respective node backward weights for each node in the net 100i other than the start node 103i.

The sideways pass stage 88 follows the backwards pass stage 86. It is a sideways recursion which is used in accordance with the invention to derive updated probabilistic association vectors (the required output of the track talking stage 14D). For this stage it is necessary to define a through node weight $p_{th}(m_i|n_j)$ as a weight with a relationship of measurement index $m_i$ through child node number $n_j$: a through node weight is the backward weight $p_B(n_j)$ of the child node multiplied by the weight $p(\omega_{jm_i})$ (referred to earlier as $p(\omega_{ji})$) associated with the relationship $m_i$ from the probabilistic association vector prior to updating and by a forward weight $p_{\Sigma P}(m_i, n_j)$ which is a sum over weights of relationships between the child node and each parent node in its list of parent nodes, i.e.:

$$p_{th}(m_i \mid n_j) = p_B(n_j) p(\omega_{jm_i}) p_{\Sigma P}(m_i, n_j) \quad (47)$$

$$\text{where: } p_{\Sigma P}(m_i, n_j) = \sum_{n'_{j-1} \in P(n_j), R(n'_{j-1}, n_j) = m_i} p_F(n'_{j-1}) \quad (48)$$

and where: $n'_{j-1} \in P(n_j)$ indicates the Equation (48) summation is over only those values of $n'_{j-1}$ which are in a child node's list $P(n_j)$ of parents, and $R(n'_{j-1}, n_j)$ is a relationship (measurement index $m_i$) between the $n_j$th child node (jth track) and the $n'_{j-1}$th parent node (J−1th track) limiting the summation to relationship $m_i$.

Because $p_{\Sigma P}(m_i, n_j)$ in Equation (47) is a sum over weights of relationships, Equation (45) itself can be evaluated as a sum of contributions $p_B(n_j) p(\omega_{jm_i}) p_F(n'_{j-1})$ associated with individual weights of relationships $p_F(n'_{j-1})$; i.e. Equation (45) can be expressed as:

$$p_{th}(m_i \mid n_j) = p_B(n_j) p(\omega_{jm_i}) \sum_{n'_{j-1} \in P(n_j), R(n'_{j-1}, n_j) = m_i} p_F(n'_{j-1}) \quad (49)$$

As will be described with reference to FIG. 16 below, it is convenient to derive $p_{th}(m_i|n_j)$ using Equation (49).

After obtaining through node weights for every node in the net 100i other than top node 102i, the updated probabilistic association vectors required from track talking stage 14D may now be calculated. This is carried out firstly by calculating an unnormalised weight $p_{PAV}^{\#}(m_i|j)$: this weight is associated with measurement index $m_i$ in the updated probabilistic association vector of track j, and is given for a track by summing through node weights for that track's nodes (of which there are $N_{n_j}$), i.e.:

$$p_{PAV}^{\#}(m_i \mid j) = \sum_{n_j=1}^{N_{n_j}} p_{th}(m_i \mid n_j) \quad (50)$$

A normalised updated probabilistic association vector weight $p_{PAV}(m_i|j)$ or part vector element is obtained by summing the left hand side of Equation (50) over all measurement indices $m_i$ in the updated probabilistic association vector of track number j, and dividing its left hand side by the result, i.e.:

$$p_{PAV}(m_i \mid j) = \frac{p_{PAV}^{\#}(m_i \mid j)}{\sum_{m_i} p_{PAV}^{\#}(m_i \mid j)} \quad (51)$$

Equation (51) has the effect of providing for weights in each updated probabilistic association vector to sum to unity.

Evaluation of Equation (49) for each measurement index of a track and associating the result with a corresponding measurement index provides a composite vector element for the updated probabilistic association vector of that track. Repeating this for the track's other measurement indices provides the updated probabilistic association vector for that track. Repeating this for all $N_T$ tracks provides the necessary updated probabilistic association vectors required for output from the track talking stage 14D for the current set of measurements.

Figure 16:
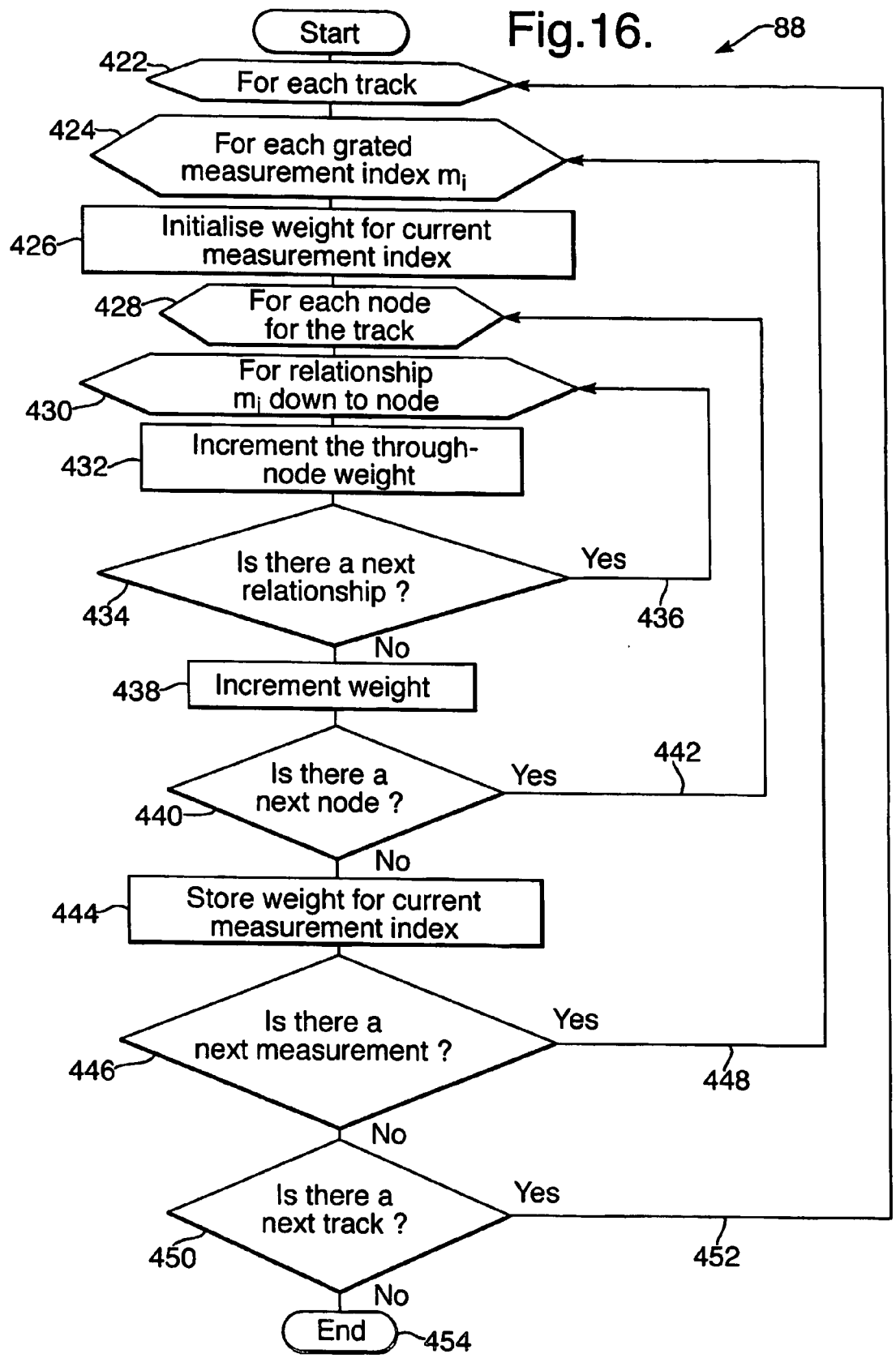
FIG. 16 is a flow diagram of computer system operation for calculation of through node weights for updating probabilistic association vectors.

Referring now to FIG. 16, there is shown a flow diagram of computer system operation for the sideways pass stage 88. A first or track iteration loop is entered at 422 in which tracks are selected iteratively in normal (forward) order, i.e. tracks 1 to 4 in succession. Track 1 is selected as the current track on a first iteration, and then at 424 a second or measurement iteration loop is entered. This second loop designates which measurement index $m_i$ in a updated probability association vector is associated with the weight being calculated. Here a first measurement within the track 1 gate is selected initially, and at 426 its weight is initialised to zero. A third or node iteration loop is entered at 428 in which nodes of the current track are selected iteratively starting with a first node. In a first iteration of this third loop, the first node (index Ø) of track 1 is selected.

A fourth (relationship iteration) loop beginning at 430 is then entered in which each relationship between the top node 102i and this first node of track 1 are selected iteratively. On each fourth loop iteration, the selected relationship is examined to see if its measurement index $m_i$ is as designated at the current iteration of the second loop beginning at 424. If $m_i$ is as so designated, at 432 a contribution (general form $p_B(n_j) p(\omega_{ji}) p_F(n'_{j-1})$) to a through node weight (general form $p_{th}(m_i|n_j)$) for a first relationship (Ø) of the first node of track 1 is calculated. If $m_i$ is not as so designated, the contribution is treated as being zero. The contribution is added as an increment to a stored accumulating sum (initially zero) of such contributions. At 434, a check is made to determine whether or not there are any other relationships for the node under consideration, and if so iteration proceeds via a link 436 round the fourth loop 430 to 436 until all have been considered. The first node of track 1 has one other relationship (1), so the fourth loop 428 to 436 iterates once more providing a second increment (albeit equal to zero in this case) to the accumulating sum at 432. Since there are no other relationships for the first node of track 1, the accumulating (now accumulated) sum is an evaluation of Equation (47) for the first node of track 1 to give a through node weight of the kind $p_{th}(m_i|n_j)$. At 434 there is now no next relationship, and the process passes to stage 438, where the fourth loop accumulated sum provides a weight increment for a third loop accumulating sum.

In a succeeding stage 440, a check is made to determine whether or not there are any other nodes for track 1, and if so iteration proceeds via a link 442 until all have been considered. Since track 1 in this example has three nodes with identities Ø, 2 and 3, there are a total of three iterations round the third loop 428 to 442.

When there is no further node unconsidered for track 1, weight incrementation at 438 has ended giving rise to a third loop accumulated sum which represents evaluation of Equation (48), an unnormalised probability association vector element of the kind $p_{PAV}^{\#}(m_i|j)$ for the first measurement index and track 1. At 444 this sum stored for the current measurement index $m_i$. The next stage 446 is a check to see if there are any further measurements in the gate of track 1, and if so the second loop is reactivated via a link 448 to measurement designation at 424. The second loop iterates until there are no further measurements for track 1, at which point the sums stored at 444 are added together to produce an overall sum by which to divide the $p_{PAV}^{\#}(m_i|j)$ elements for normalisation to implement Equation (51) (FIG. 16 does not show addition and normalisation explicitly, which are treated as subsumed within 446). This produces a normalised probability association vector for track 1. The process passes to a stage 448, where a check is made to determine whether or not there are any other tracks. Tracks 2, 3 and 4 remain, so via a link 452 the first loop 422 to 452 is reactivated for these tracks in succession to produce a respective normalised probability association vector for each of them. The sideways pass stage 88 ends at 454 when there are no more tracks, as indeed does the track talking stage 14D.

The scientific literature provides a number of alternatives for process stages described in the above specific embodiment. Track components may be Gaussians, as in algorithms based on the extended Kalman filter, (EKF). EKF-based algorithms are known, e.g. algorithms such as a probabilistic data association filter (PDAF) and joint probabilistic data association filter (JPDAF) are disclosed by Bar-Shalom et al. (see above) who also disclose multi-frame assignment (MFA). Another such algorithm for a multiple hypothesis tracker (MHT) is disclosed by S. Blackman and R. Popoli in "Design and Analysis of Modern Tracking Systems", Artech House, Boston/London, 1-58053-006-0, 1999. Higher dimensional generalisations of the PDAF are disclosed by L Y Pao, "Multisensor multitarget mixture reduction algorithms for target tracking", Journal of Guidance Control and Dynamics, 17, pages 1205-1211, 1994. Track components may instead be delta functions, as is the case for an hidden Markov model (HMM) disclosed by Rabiner et al. or a particle filter. A particle filter is disclosed by S Arulampalam, S Maskell, N J Gordon, and T Clapp, "A tutorial on particle filters for on-line non-linear/non-Gaussian Bayesian tracking", IEEE Transactions on Signal Processing, 50(2), February 2002. The use of delta functions alters implementation of process stages.

Blackman et al. also disclose a number of different bases for the track termination stage 14C, and alternative approaches to the track initiation stage 14B.

Bar-Shalom et al. disclose a number of different models for different sensors and dynamics. They also disclose ways of conducting mixture reduction such that mixture reduction stage 52 in track maintenance prior 22 leaves the track unchanged and mixture reduction stage 74 in track maintenance post 34 conducts mixture reduction relating to model history. It is also known to employ different ways of mixture reduction such that mixture reduction 74 may consider a longer lag of associations to consider two components to be in the same set.

Bar-Shalom et al. also disclose implementing a prediction stage 54 based on linearisation (as with the EKF. Another alternative for this stage is a deterministic sampling scheme, as with the unscented Kalman filter, see S. Julier and J. K. Uhlmann. "A new extension of the Kalman Filter to non-linear systems." Proc. of AeroSense: The 11th Int. Symp. on Aerospace/Defence Sensing, Simulation and Controls, 1997.

The scientific literature also discloses a number of alternative implementations of a track talking stage 14D. This stage could involve hard decision logic, as with global nearest neighbour (GNN) disclosed by Blackman et al. Alternatively it could involve a soft decision logic, as with JPDAF disclosed by Bar-Shalom et al. A hard decision logic results in one hypothesis for each track getting a weight of one (and all the others a weight of zero). The hypotheses are chosen so that the combination of hypotheses maximises the cost (often the probability) of the combinations of associations. A soft decision logic results in modified weights such that the new weight for a given hypothesis is the average of all the combinations of hypotheses that include the given hypothesis. Previous approaches in both a Kalman filter and particle filter context have been called JPDAF and mutual exclusion. Mutual exclusion is disclosed by J. MacCormick and A. Blake, "A probabilistic exclusion principle for tracking multiple objects", Proc. International Conference on Computer Vision, Kerkyra, Korfu, 1999.

These approaches have been assumed to have a computational cost that grows exponentially with number of tracks. Other processes such as that disclosed by Blackman et al. require the components to have longer association histories associated with them and make a lagged hard decision for track talking. Here "lagged" refers to a decision made over several time intervals or lags.

The scientific literature has identified that equivalence of nodes can be used to reduce computation expense explicitly in a soft decision logic, see Zhou et al. previously mentioned. This reduction has also been shown to be achievable in a hard decision logic (a) implicitly and (b) explicitly, as referenced below:

(a) G. Carpaneto and P. Toth. Solution of the assignment problem (algorithm 548). ACM Trans. Math. Software, pages 104-111, 1980.

(b) Y. Li and A. Hilton. Towards reliable real-time multiview tracking, Proc of IEEE Workshop on Multi-Object Tracking, July 2001.

The prior art describes a number of methods for implementing association probability calculator and reprojection stages 62/70. In Drummond, O. E., "Target Tracking with Retrodicted Probabilities", Signal and Data Processing of Small Targets 1997, Proc. SPIE, Vol. 3163 and Koch, W., "Retrodiction for Bayesian multiple hypothesis/multiple target tracking in densely cluttered environment", Signal and Data Processing of Small Targets 1996, Proc. SPIE, Vol. 2759, the probabilistic association vectors are in terms of the measurements from a previous measurement set, rather than the current measurement set, and the approaches respectively employ hard and soft decision logics.

The equations and procedures given in the foregoing description can clearly be implemented in automated fashion by an appropriate computer program comprising program instructions recorded on an appropriate carrier medium and running on a conventional computer system. The carrier medium may be a memory, a floppy or compact or optical disc or other hardware recordal medium, or an electrical or optical signal. Such a program is straightforward for a skilled programmer to implement from the foregoing description without requiring invention, because it involves well known computational procedures. The computer system with such programming may then be used in combination with any measuring system to assign measurement parameters to evolving phenomena such as target tracks to determine trajectories for such phenomena, as described with reference to FIGS. 1(*a*) and 1(*b*).

The invention claimed is:

1. A method of signal processing with reduced combinatorial complexity for evolving phenomena associated with obtainable parameters, the method including the steps of:

a) selecting from the phenomena a current phenomenon which is previously unprocessed by the method of the invention; and
b) obtaining a parameter set associated with the current phenomenon;
c) designating a start node as a parent node;
d) if there is a previously processed phenomenon with at least one existing node not yet treated as the parent node, treating the one such existing node as the parent node instead of the start node;
e) selecting a parameter from the parameter set;
f) producing a child node identity associated with the selected parameter;
g) representing child nodes of like identity for the selected phenomenon as a single node with multiple parameter relationships corresponding to parameters associated with at least one parent node;
h) representing child nodes with differing identities as separate nodes;
i) iterating e) to h) for other parameters in the set if available;
j) if there remain one or more existing nodes not yet treated as the parent node iterating d) to i) until none such remain;
k) iterating a) to j) for other phenomena in the set; and
l) deriving updated sets of parameter weights associated with respective phenomena by iterating over node relationships and identities.

2. A method according to claim 1 wherein the step of deriving updated sets of parameter weights for phenomena comprises the steps of calculating for each phenomenon:
a) forward weights for the phenomenon's child nodes by summing forward weights for respective parent, grandparent etc. nodes (where available) weighted by associated phenomenon/parameter weights;
b) backward weights for the phenomenon's child nodes by summing forward weights for respective child of child, grandchild of child etc. nodes (where available) weighted by associated phenomenon/parameter weights;
c) a respective through node weight for each parameter relationship of each of the phenomenon's child nodes by multiplying its backward weight by a parameter weight obtained prior to updating and also by a summation of forward weights of the child node's parent nodes associated with that relationship; and
d) for each parameter associated with the phenomenon, a sum of the through node weights of the phenomenon's child nodes for the corresponding parameter relationship.

3. A method according to claim 2 including the step of normalising the parameter weights for each phenomenon by dividing each of them by their sum over all parameters associated with the phenomenon.

4. A method according to claim 1 wherein the step of producing a child node identity expresses the identity in terms of:
a) either parameters unavailable for use in connection with subsequently generated child node identities, or
b) parameters remaining available for such use.

5. A method according to claim 4 wherein the step of producing a child node identity is implemented by calculating an intersection of parameters assignable to subsequent phenomena (if unused) with a union of an identity of a parent node of a child node of the current phenomenon and a parameter expressing a relationship being implemented between the parent and child nodes in this iteration: i.e. representing set intersection and union operations by $\cap$ and $\cup$, then for a current phenomenon $T_j$, parameter $m_k$, accumulated measurements $acc(j)$ and parent node identity $I_p$, the child identity $I_{Ch}$ is given by: $I_{Ch} = acc(j) \cap (I_p \cup m_k)$.

6. A method of signal processing with reduced combinatorial complexity to determine trajectories for evolving physical phenomena associated with measurable parameters, the method including the steps of:
a) selecting from the phenomena a current phenomenon which is previously unprocessed by the method of the invention; and
b) measuring a parameter set associated with the current phenomenon;
c) designating a start node as a parent node;
d) if there is a previously processed phenomenon with at least one existing node not yet treated as the parent node, treating the one such existing node as the parent node instead of the start node;
e) selecting a parameter from the parameter set;
f) producing a child node identity associated with the selected parameter;
g) representing child nodes of like identity for the selected phenomenon as a single node with multiple parameter relationships corresponding to parameters associated with at least one parent node;
h) representing child nodes with differing identities as separate nodes;
i) iterating e) to h) for other parameters in the set if available;
j) if there remain one or more existing nodes not yet treated as the parent node iterating d) to i) until none such remain;
k) iterating a) to j) for other phenomena in the set;
l) deriving updated sets of parameter weights associated with respective phenomena by iterating over node relationships and identities; and
m) determining respective trajectories for the phenomena from the updated sets of parameter weights.

7. A method of signal processing with reduced combinatorial complexity to determine trajectories for evolving physical phenomena associated with obtainable parameters, the method including
a) associating child node identities with the parameters,
b) treating child nodes of like identity for a phenomenon as a single node with multiple parameter relationships corresponding to parameters associated with at least one parent node; and
c) representing child nodes with differing identities as separate nodes.

8. A method of tracking targets by radar to measure range and bearing parameters and determine associated evolving target tracks, the method including
a) measuring range and bearing parameters;
b) associating child node identities with the parameters,
c) treating child nodes of like identity for a target track as a single node with multiple parameter relationships corresponding to parameters associated with at least one parent node;
d) representing child nodes with differing identities as separate nodes;
e) determining updated probability association weights and associated measured parameter assignments for the relationships;
f) modifying tracks to reflect the updated probability association weights and associated measured parameter assignments.

9. Apparatus for signal processing with reduced combinatorial complexity for evolving phenomena comprising means for obtaining parameters associated with the evolving phenomena and computer apparatus programmed to:
   a) select from the phenomena a current phenomenon which is previously unprocessed by the apparatus of the invention; and
   b) obtain a parameter set associated with the current phenomenon;
   c) designate a start node as a parent node;
   d) if there is a previously processed phenomenon with at least one existing node not yet treated as the parent node, treat one such existing node as the parent node instead of the start node;
   e) select a parameter from the parameter set;
   f) produce a child node identity associated with the selected parameter;
   g) represent child nodes of like identity for the selected phenomenon as a single node with multiple parameter relationships corresponding to parameters associated with at least one parent node;
   h) represent child nodes with differing identities as separate nodes;
   i) iterate e) to h) for other parameters in the set;
   j) if there remain one or more existing nodes not yet treated as the parent node iterate d) to i) until none such remain;
   k) iterate a) to j) for other phenomena in the set; and
   l) derive updated sets of parameter weights associated with respective phenomena by iterating over node relationships and identities.

10. Apparatus according to claim 9 wherein the computer apparatus is programmed to derive updated sets of parameter weights by calculating for each phenomenon:
   a) forward weights for the phenomenon's child nodes by summing forward weights for respective parent, grandparent etc. nodes (where available) weighted by associated phenomenon/parameter weights;
   b) backward weights for the phenomenon's child nodes by summing forward weights for respective child of child, grandchild of child etc. nodes (where available) weighted by associated phenomenon/parameter weights;
   c) a respective through node weight for each parameter relationship of each of the phenomenon's child nodes by multiplying its backward weight by a parameter weight obtained prior to updating and also by a summation of forward weights of the child node's parent nodes associated with that relationship; and
   d) for each parameter associated with the phenomenon, a sum of the through node weights of the phenomenon's child nodes for the corresponding parameter relationship.

11. Apparatus according to claim 10 wherein the computer apparatus is programmed to normalise the parameter weights for each phenomenon by dividing each of them by their sum over all parameters associated with the phenomenon.

12. Apparatus according to claim 9 wherein the computer apparatus is programmed to produce a child node identity expressed in terms of:
   a) either parameters unavailable for use in connection with subsequently generated child node identities, or
   b) parameters remaining available for such use.

13. Apparatus according to claim 12 wherein the computer apparatus is programmed to produced a child node identity by calculating an intersection of parameters assignable (if unused) to subsequent phenomena with a union of an identity of a parent node of a child node of the current phenomenon and a parameter expressing a relationship being implemented between the parent and child nodes in this iteration: i.e. representing set intersection and union operations by $\cap$ and $\cup$, then for a current phenomenon $T_j$, parameter $m_k$, accumulated measurements $acc(j)$ and parent node identity $I_p$, the child identity $I_{Ch}$ is given by: $I_{Ch} = acc(j) \cap (I_p \cup m_k)$.

14. Apparatus for signal processing with reduced combinatorial complexity for determining trajectories for evolving physical phenomena comprising means for measuring parameters associated with the evolving phenomena and computer apparatus programmed to execute the steps of:
   a) selecting from the phenomena a current phenomenon which is previously unprocessed by the apparatus of the invention; and
   b) measuring a parameter set associated with the current phenomenon;
   c) designating a start node as a parent node;
   d) if there is a previously processed phenomenon with at least one existing node not yet treated as the parent node, treating the one such existing node as the parent node instead of the start node;
   e) selecting a parameter from the parameter set;
   f) producing a child node identity associated with the selected parameter;
   g) representing child nodes of like identity for the selected phenomenon as a single node with multiple parameter relationships corresponding to parameters associated with at least one parent node;
   h) representing child nodes with differing identities as separate nodes;
   i) iterating e) to h) for other parameters in the set if available;
   j) if there remain one or more existing nodes not yet treated as the parent node iterating d) to i) until none such remain;
   k) iterating a) to j) for other phenomena in the set;
   l) deriving updated sets of parameter weights associated with respective phenomena by iterating over node relationships and identities; and
   m) determining respective trajectories for the phenomena from the updated sets of parameter weights.

15. Apparatus for signal processing with reduced combinatorial complexity to determine trajectories for evolving physical phenomena comprising means for obtaining parameters associated with the evolving phenomena and computer apparatus programmed execute the steps of:
   a) associating child node identities with the parameters,
   b) treating child nodes of like identity for a phenomenon as a single node with multiple parameter relationships corresponding to parameters associated with at least one parent node; and
   c) representing child nodes with differing identities as separate nodes.

16. Apparatus for tracking targets including radar apparatus for measuring range and bearing parameters and computer apparatus programmed to determine associated evolving target tracks by executing the steps of
   a) associating child node identities with range and bearing parameters measured by the radar apparatus,
   b) treating child nodes of like identity for a target track as a single node with multiple parameter relationships corresponding to parameters associated with at least one parent node;

c) representing child nodes with differing identities as separate nodes;

d) determining updated probability association weights and associated measured parameter assignments for the relationships; and e) modifying tracks to reflect the updated probability association weights and associated measured parameter assignments.

17. Computer software for use in signal processing with reduced combinatorial complexity for evolving phenomena associated with obtainable parameters, the computer software incorporating instructions for controlling computer apparatus to execute the steps of:

a) selecting from the phenomena a current phenomenon which is previously unprocessed using the software of the invention; and b) obtaining a parameter set associated with the current phenomenon;

c) designating a start node as a parent node;

d) if there is a previously processed phenomenon with at least one existing node not yet treated as the parent node, treating the one such existing node as the parent node instead of the start node;

e) selecting a parameter from the parameter set;

f) producing a child node identity associated with the selected parameter;

g) representing child nodes of like identity for the selected phenomenon as a single node with multiple parameter relationships corresponding to parameters associated with at least one parent node;

h) representing child nodes with differing identities as separate nodes;

i) iterating e) to h) for other parameters in the set if available;

j) if there remain one or more existing nodes not yet treated as the parent node iterating d) to i) until none such remain;

k) iterating a) to j) for other phenomena in the set; and l) deriving updated sets of parameter weights associated with respective phenomena by iterating over node relationships and identities.

18. Computer software according to claim 17 incorporating instructions for controlling computer apparatus to derive updated sets of parameter weights for phenomena by calculating for each phenomenon:

a) forward weights for the phenomenon's child nodes by summing forward weights for respective parent, grandparent etc. nodes (where available) weighted by associated phenomenon/parameter weights;

b) backward weights for the phenomenon's child nodes by summing forward weights for respective child of child, grandchild of child etc. nodes (where available) weighted by associated phenomenon/parameter weights;

c) a respective through node weight for each parameter relationship of each of the phenomenon's child nodes by multiplying its backward weight by a parameter weight obtained prior to updating and also by a summation of forward weights of the child node's parent nodes associated with that relationship; and d) for each parameter associated with the phenomenon, a sum of the through node weights of the phenomenon's child nodes for the corresponding parameter relationship.

19. Computer software according to claim 18 incorporating instructions for controlling computer apparatus to execute the step of normalising the parameter weights for each phenomenon by dividing each of them by their sum over all parameters associated with the phenomenon.

20. Computer software according to claim 16 incorporating instructions for controlling computer apparatus to produce a child node identity expressed in terms of:

a) either parameters unavailable for use in connection with subsequently generated child node identities, or b) parameters remaining available for such use.

21. Computer software according to claim 20 incorporating instructions for controlling computer apparatus to execute the step of producing a child node identity by calculating an intersection of parameters assignable to subsequent phenomena (if unused) with a union of an identity of a parent node of a child node of the current phenomenon and a parameter expressing a relationship being implemented between the parent and child nodes in this iteration: i.e. representing set intersection and union operations by $\cap$ and $U$, then for a current phenomenon $T_j$, parameter $m_k$, accumulated measurements $acc(j)$ and parent node identity $I_p$, the child identity $I_{Ch}$ is given by: $I_{Ch}=acc(j)\cap(I_p U m_k)$.

22. Computer software for use in signal processing with reduced combinatorial complexity for evolving phenomena associated with obtainable parameters, the software incorporating instructions for controlling computer apparatus to execute the steps of:

a) selecting from the phenomena a current phenomenon which is previously unprocessed by the software of the invention; and b) obtaining a parameter set associated with the current phenomenon;

c) designating a start node as a parent node;

d) if there is a previously processed phenomenon with at least one existing node not yet treated as the parent node, treating the one such existing node as the parent node instead of the start node;

e) selecting a parameter from the parameter set;

f) producing a child node identity associated with the selected parameter;

g) representing child nodes of like identity for the selected phenomenon as a single node with multiple parameter relationships corresponding to parameters associated with at least one parent node;

h) representing child nodes with differing identities as separate nodes;

i) iterating e) to h) for other parameters in the set if available;

j) if there remain one or more existing nodes not yet treated as the parent node iterating d) to i) until none such remain;

k) iterating a) to j) for other phenomena in the set;

l) deriving updated sets of parameter weights associated with respective phenomena by iterating over node relationships and identities; and m) determining respective trajectories for the phenomena from the updated sets of parameter weights.

23. Computer software for use in signal processing with reduced combinatorial complexity to determine trajectories for evolving physical phenomena associated with obtainable parameters, the computer software incorporating instructions for controlling computer apparatus to execute the steps of:

a) associating child node identities with the parameters, b) treating child nodes of like identity for a phenomenon as a single node with multiple parameter relationships corresponding to parameters associated with at least one parent node; and c) representing child nodes with differing identities as separate nodes.

24. Computer software for use in tracking targets by radar to measure range and bearing parameters and determine associated evolving target tracks, characterised in that the computer software incorporates instructions for controlling computer apparatus to execute the steps of:
  a) associating child node identities with range and bearing parameters measured by radar;
  b) treating child nodes of like identity for a target track as a single node with multiple parameter relationships corresponding to parameters associated with at least one parent node;
  c) representing child nodes with differing identities as separate nodes;
  d) determining updated probability association weights and associated measured parameter assignments for the relationships; and
  e) modifying tracks to reflect the updated probability association weights and associated measured parameter assignments.

* * * * *